United States Patent
Yamasaki et al.

(10) Patent No.: US 8,391,120 B2
(45) Date of Patent: Mar. 5, 2013

(54) OPTICAL HEAD, OPTICAL DISC DEVICE AND INFORMATION PROCESSING DEVICE

(75) Inventors: Fumitomo Yamasaki, Nara (JP); Kousei Sano, Osaka (JP); Tomoaki Tojo, Hyogo (JP); Katsuhiko Hayashi, Nara (JP); Yoshiaki Komma, Osaka (JP)

(73) Assignee: Panasonic Corporation, Osaka (JP)

( * ) Notice: Subject to any disclaimer, the term of this patent is extended or adjusted under 35 U.S.C. 154(b) by 721 days.

(21) Appl. No.: 12/604,758

(22) Filed: Oct. 23, 2009

(65) Prior Publication Data

US 2010/0103803 A1    Apr. 29, 2010

Related U.S. Application Data

(60) Provisional application No. 61/108,245, filed on Oct. 24, 2008.

(30) Foreign Application Priority Data

Dec. 26, 2008    (JP) ................................ 2008-332575

(51) Int. Cl.
*G11B 7/135*    (2012.01)
(52) U.S. Cl. ............................... 369/112.23; 369/112.24
(58) Field of Classification Search ........................ None
See application file for complete search history.

(56) References Cited

U.S. PATENT DOCUMENTS

| | | | |
|---|---|---|---|
| 7,251,209 B2 | 7/2007 | Cho et al. | |
| 2003/0202453 A1 | 10/2003 | Cho et al. | |
| 2006/0028935 A1 | 2/2006 | Mori et al. | |
| 2008/0049585 A1* | 2/2008 | Shindo ..................... | 369/112.23 |
| 2008/0219131 A1* | 9/2008 | Hendriks et al. ......... | 369/112.23 |
| 2009/0010113 A1 | 1/2009 | Kamioka | |
| 2009/0046564 A1 | 2/2009 | Yamasaki et al. | |

FOREIGN PATENT DOCUMENTS

| | | |
|---|---|---|
| JP | 11-259906 | 9/1999 |
| JP | 2004-5944 | 1/2004 |
| JP | 2006-120283 | 5/2006 |
| JP | 2007-5944 | 1/2007 |
| JP | 2009-15935 | 1/2009 |
| JP | 2009-116937 | 5/2009 |
| JP | 2009-146477 | 7/2009 |
| WO | 2007/119410 | 10/2007 |

OTHER PUBLICATIONS

International Search Report issued Jan. 26, 2010 in International (PCT) Application No. PCT/JP2009/005497.

* cited by examiner

*Primary Examiner* — Christopher R Lamb
(74) *Attorney, Agent, or Firm* — Wenderoth, Lind & Ponack, L.L.P.

(57) ABSTRACT

An optical head, an optical disc device and an information processing device are capable of suppressing the amount of third-order astigmatism created upon recording or reproducing information on or from a multi-layer optical disc including at least three information recording surfaces. An objective lens satisfies a relationship of $tc > (t0+tn)/2$ assuming that $t0$ denotes the thickness of a light transmitting layer from the outer surface of the multi-layer optical disc to an information recording surface having the largest light transmitting layer thickness, $tn$ denotes the thickness of a light transmitting layer from the outer surface of the multi-layer optical disc to an information recording surface having the smallest light transmitting layer thickness and $tc$ denotes the thickness of a virtual light transmitting layer at which the absolute value of a third-order spherical aberration is minimum when blue-violet laser light is incident as parallel light on the objective lens.

23 Claims, 20 Drawing Sheets

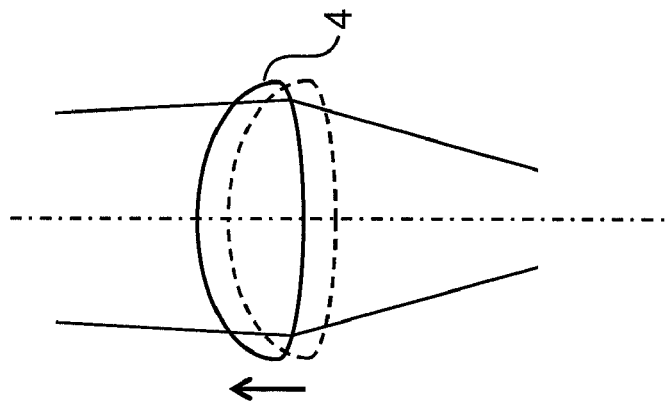
FIG. 4C  OBJECTIVE LENS SIDE  LIGHT SOURCE SIDE  CONVERGENT LIGHT
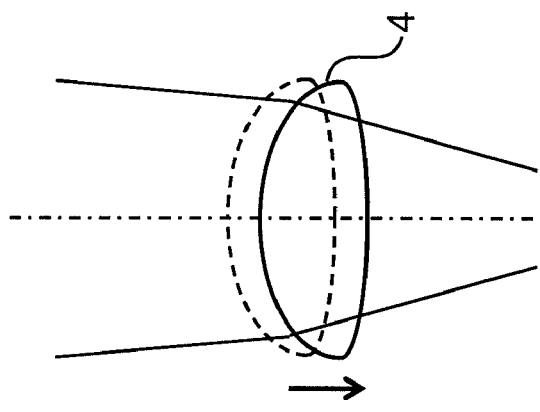
FIG. 4B  OBJECTIVE LENS SIDE  LIGHT SOURCE SIDE  DIVERGENT LIGHT
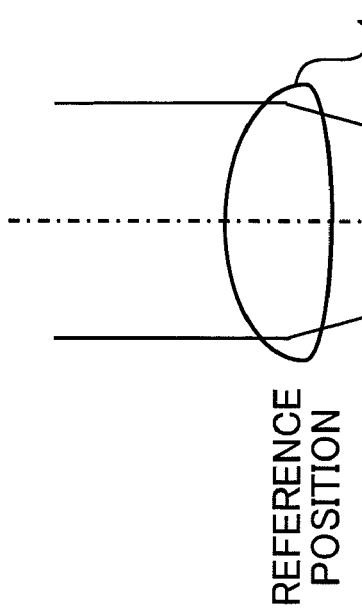
FIG. 4A  OBJECTIVE LENS SIDE  REFERENCE POSITION  LIGHT SOURCE SIDE  PARALLEL LIGHT

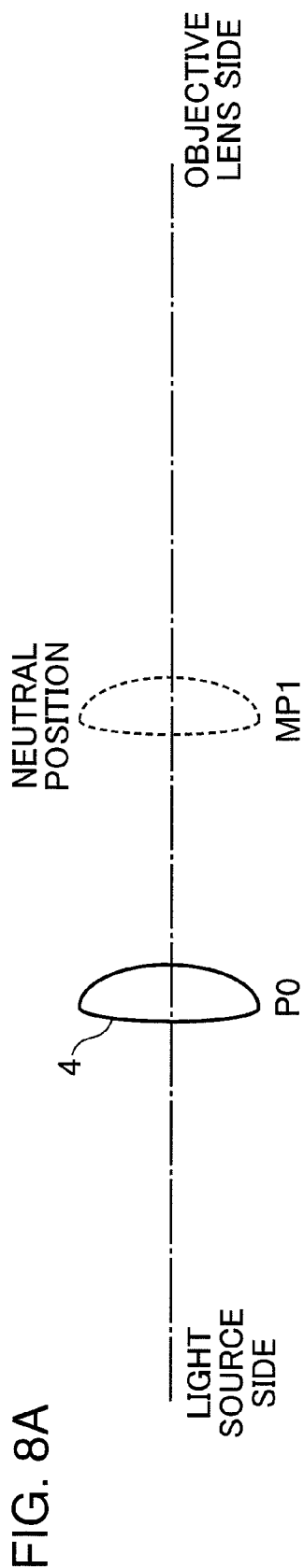
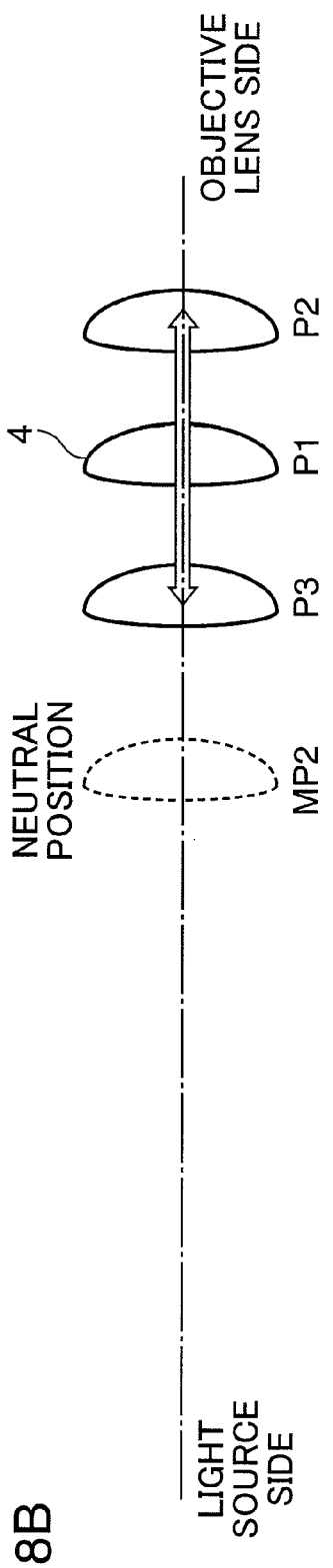
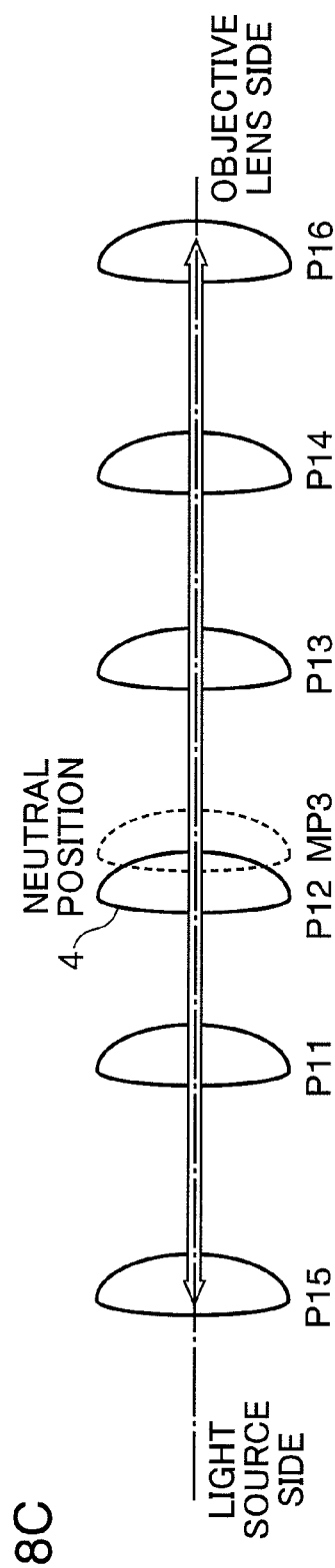

OPTICAL HEAD, OPTICAL DISC DEVICE AND INFORMATION PROCESSING DEVICE

This application claims the benefit of U.S. Provisional Application No. 61/108,245 filed Oct. 24, 2008.

BACKGROUND OF THE INVENTION

1. Field of the Invention

The present invention relates to an optical head for recording or reproducing information on or from a plurality of types of information recording media having different light transmitting layer thicknesses, an optical disc device including such an optical head and an information processing device including such an optical disc device.

2. Description of the Background Art

With the practical application of blue-violet semiconductor lasers, Blu-ray discs (Hereinafter, referred to as BDs), which are high-density and high-capacity optical information recording media having the same size as CDs (Compact Discs) and DVDs (Digital Versatile Discs), have been put to practical use.

A CD is an optical disc whose light transmitting layer has a thickness of 1.2 mm, for which laser light having a wavelength of about 785 nm and an objective lens having a numerical aperture (hereinafter, also referred to as an NA) of 0.45 to 0.52 are used to record or reproduce information and which has a storage capacity of about 650 Mbyte.

A DVD is an optical disc whose light transmitting layer has a thickness of about 0.6 mm, for which laser light having a wavelength of about 660 nm and an objective lens having an NA of 0.60 to 0.66 are used to record or reproduce information and which has a storage capacity per layer of about 4.7 Gbyte. There are two types of DVDs for practical use, i.e. single layer discs having one information recording surface and two-layer discs having two information recording surfaces.

On the other hand, a BD is an optical disc having information recorded or reproduced on or from an information recording surface having a light transmitting layer whose thickness is about 0.1 mm using a blue-violet laser light source for emitting blue-violet light having a wavelength of about 405 nm and an objective lens having an NA of about 0.85. There are also two types of BDs for practical use, i.e. single layer discs having one information recording surface and two-layer discs having two information recording surfaces, and a storage capacity per layer is about 25 Gbyte.

In the case of recording or reproducing information on or from a plurality of information recording surfaces as in the case of a BD, the thickness of the light transmitting layer differs for each information recording surface, wherefore a third-order spherical aberration is created on the information recording surface deviated from an optimal light transmitting layer thickness (thickness of the light transmitting layer at which a third-order spherical aberration is minimum when parallel light is incident on the objective lens) of an objective lens according to a deviation from the optimal light transmitting layer thickness. In the BD, if the light transmitting layer thickness deviation from the optimal light transmitting layer thickness is 10 μm, a third-order spherical aberration of about 100 mλ is created. Thus, an optical head for recording or reproducing information on or from the BD generally includes means for correcting the third-order spherical aberration.

For example, Japanese Unexamined Patent Publication No. H11-259906 discloses an optical disc device in which a collimator lens is mounted on a collimator lens actuator to move the collimator lens arranged between a light source and an objective lens in an optical axis direction and change a divergence angle or convergence angle of laser light incident on the objective lens so as to cancel out a third-order spherical aberration resulting from a light transmitting layer thickness deviation.

On the other hand, many of optical heads for high-density optical discs such as BDs each using short-wavelength laser light and an objective lens having a high NA include means for correcting a third-order coma aberration caused by the tilt of the optical disc (hereinafter, also referred to as "disc tilt"). In such an optical disc, a method for inclining the objective lens mounted on an objective lens actuator in a radial direction of the optical disc or a method using a liquid crystal element is, for example, put to practical use.

In recent years, there have been proposed compatible optical heads for recording or reproducing information on or from high-density optical discs such as CDs, DVDs and BDs by focusing laser light having three different wavelengths using a plurality of objective lenses.

Here, one construction of a conventional optical head is described with reference to FIG. 20. FIG. 20 is a diagram showing a schematic construction of the conventional optical head. In FIG. 20, an optical head 140 is provided with a blue-violet laser light source 101 for emitting blue-violet laser light, a relay lens 102, a polarization beam splitter 103, a collimator lens 104, a flat-plate mirror 105, a quarter-wave plate 106, a diffractive lens 107, an objective lens 108, an objective lens actuator 109, a two-wavelength laser light source 111 for emitting red laser light and infrared laser light, a diffraction grating 112, a flat-plate beam splitter 113, a collimator lens actuator 114, a wedge-shaped mirror 115, a quarter-wave plate 116, a compatible objective lens 118, a detection hologram 121, a detection lens 122, a light receiving element 123 and a front monitor sensor 124.

First of all, the operation of the optical head 140 in the case of recording or reproducing information on or from a BD 90 is described. The BD 90 includes two information recording surfaces L0, L1. Blue-violet laser light having a wavelength of about 405 nm and emitted from the blue-violet laser light source 101 is converted into divergent light having a different NA by the relay lens 102 and incident as S-polarized light on the polarization beam splitter 103. The blue-violet laser light reflected by the polarization beam splitter 103 is converted into substantially parallel light by the collimator lens 104 and passes through the wedge-shaped mirror 115 to be incident on the flat-plate mirror 105. A part of the blue-violet laser light incident on the flat-plate mirror 115 is reflected toward the quarter-wave plate 106. The other part of the blue-violet laser light incident on the flat-plate mirror 105 is incident on the front monitor sensor 124 after passing through the flat-plate mirror 105. Then, the output of the blue-violet laser light source 101 is controlled based on the output of the front monitor sensor 124.

On the other hand, the blue-violet laser light reflected by the flat-plate mirror 105 passes through the diffractive lens 107 after being converted into circularly polarized light by the quarter-wave plate 106. The blue-violet laser light having passed through the diffractive lens 107 is focused to be incident as a light spot on either one of the information recording surfaces L0 and L1 of the BD 90 by the objective lens 108.

The blue-violet laser light reflected by the specified information recording surface of the BD 90 is reflected by the flat-plate mirror 105 after passing through the objective lens 108 and the diffractive lens 107 again and being converted into linearly polarized light different from the one on an outward path by the quarter-wave plate 106. The blue-violet laser light reflected by the flat-plate mirror 105 is incident as P-polarized light on the polarization beam splitter 103 after passing through the wedge-shaped mirror 115 and the collimator lens 104. The blue-violet laser light having passed through the polarization beam splitter 103 is introduced to the light receiving element 123 via the flat-plate beam splitter 113, the detection hologram 121 and the detection lens 122. The blue-violet laser light detected by the light receiving element 123 is photoelectrically converted. A signal generated by the photoelectric conversion is calculated by an unillustrated controller to generate a focus error signal used to follow a surface runout of the BD 90 and a tracking error signal used to follow the eccentricity of the BD 90.

Next, the operation of the optical head 140 in the case of recording or reproducing information on or from a DVD 70 is described. Red laser light having a wavelength of about 660 nm and emitted from the two-wavelength laser light source 111 is separated into a main beam as $0^{th}$-order light and sub beams as $\pm 1^{st}$-order diffracted light by the diffraction grating 112. The main beam and the sub beams are incident as S-polarized light on the flat-plate beam splitter 113. The red laser light reflected by the flat-plate beam splitter 113 passes through the polarization beam splitter 103 and is converted into substantially parallel light by the collimator lens 104 to be incident on the wedge-shaped mirror 115. A part of the red laser light incident on the wedge-shaped mirror 115 is reflected toward the quarter-wave plate 116. The other part of the red laser light incident on the wedge-shaped mirror 115 is incident on the front monitor sensor 124 after passing through the wedge-shaped mirror 115 and the flat-plate mirror 105. The output of the red laser light of the two-wavelength laser light source 111 is controlled based on the output of the front monitor sensor 124.

On the other hand, the red laser light reflected by the wedge-shaped mirror 115 is focused as a light spot on an information recording surface of the DVD 70 by the compatible objective lens 118 after being converted into circularly polarized light by the quarter-wave plate 116.

The red laser light reflected by the information recording surface of the DVD 70 is reflected by the wedge-shaped mirror 115 after passing through the compatible objective lens 118 again and being converted into linearly polarized light different from the one on an outward path by the quarter-wave plate 116. The red laser light reflected by the wedge-shaped mirror 115 is incident as P-polarized light on the polarization beam splitter 103 and the flat-plate beam splitter 113 after passing through the collimator lens 104. The red laser light having passed through the polarization beam splitter 103 and the flat-plate beam splitter 113 is introduced to the light receiving element 123 via the detection hologram 121 and the detection lens 122. The red laser light detected by the light receiving element 123 is photoelectrically converted. A signal generated by the photoelectric conversion is calculated by the unillustrated controller to generate a focus error signal used to follow a surface runout of the DVD 70 and a tracking error signal used to follow the eccentricity of the DVD 70.

Next, the operation of the optical head 140 in the case of recording or reproducing information on or from a CD 80 is described. Infrared laser light having a wavelength of about 785 nm and emitted from the two-wavelength laser light source 111 is separated into a main beam as $0^{th}$-order light and sub beams as $\pm 1^{st}$-order diffracted light by the diffraction grating 112. The main beam and the sub beams are reflected by the flat-plate beam splitter 113 and pass through the polarization beam splitter 103. The infrared laser light having passed through the polarization beam splitter 103 is converted into substantially parallel light by the collimator lens 104 and incident on the wedge-shaped mirror 115. A part of the infrared laser light incident on the wedge-shaped mirror 115 is reflected toward the quarter-wave plate 116. The other part of the infrared laser light incident on the wedge-shaped mirror 115 is incident on the front monitor sensor 124 after passing through the wedge-shaped mirror 115 and the flat-plate mirror 105. The output of the infrared laser light of the two-wavelength laser light source 111 is controlled based on the output of the front monitor sensor 124.

On the other hand, the infrared laser light reflected by the wedge-shaped mirror 115 is focused as a light spot on an information recording surface of the CD 80 by the compatible objective lens 118 after passing through the quarter-wave plate 116.

The infrared laser light reflected by the information recording surface of the CD 80 is reflected by the wedge-shaped mirror 115 after passing through the compatible objective lens 118 and the quarter-wave plate 116 again. The infrared laser light reflected by the wedge-shaped mirror 115 passes through the polarization beam splitter 103 and the flat-plate beam splitter 113 after passing through the collimator lens 104. The infrared laser light having passed through the flat-plate beam splitter 113 is introduced to the light receiving element 123 via the detection hologram 121 and the detection lens 122. The infrared laser light detected by the light receiving element 123 is photoelectrically converted. A signal generated by the photoelectric conversion is calculated by the unillustrated controller to generate a focus error signal used to follow a surface runout of the CD 80 and a tracking error signal used to follow the eccentricity of the CD 80.

The optical head for recording or reproducing information on or from information recording media such as optical discs includes the front monitor sensor for detecting a part of laser light emitted from the light source in order to more accurately control the output of the laser light emitted from the light source particularly for recording. A detection signal in this front monitor sensor is an APC (Auto Power Control) signal. The APC signal is fed back to the controller for controlling the output of the light source. The APC signal is used to control the output of the light source so that suitable power necessary to record and/or reproduce information can be obtained.

Here, in the optical construction shown in FIG. 20, laser light emitted from the light source is converted into substantially parallel light, for example, by the collimator lens or the like and this substantially parallel light propagates toward the front monitor sensor by passing through or being reflected by the parallel-plate reflecting mirror. In such an optical construction, an optical axis of the laser light propagating toward the front monitor sensor after passing through or being reflected by the parallel-plate reflecting mirror and that of the laser light propagating toward the front monitor sensor after being internally reflected in the reflecting mirror become substantially parallel, thereby causing an interference. As a result, the APC signal in the front monitor sensor can be no longer accurately proportional to the output of the light source.

Accordingly, Japanese Unexamined Patent Publication No. 2004-5944 discloses such an optical construction that convergent or divergent light is incident on a parallel-plate beam splitter, so that the interference of laser light caused by internal reflection in the parallel-plate beam splitter is suppressed. Japanese Unexamined Patent Publication No. 2004-5944 also discloses an optical construction for suppressing the interference of laser light caused by internal reflection in a wedge-shaped beam splitter by using the wedge-shaped beam splitter.

For higher capacity of optical discs, it is thought to adopt a multi-layer structure comprised of three or more layers for information recording surfaces of high-density optical discs such as BDs. In an optical disc including a plurality of information recording surfaces, it is necessary to ensure a specified spacing between information recording surfaces in order to suppress the influence of reflected light (stray light) from the adjacent information recording surfaces (crosstalk of information signal, offset of a servo signal caused by stray light reflected by the adjacent information recording surfaces, etc.). Accordingly, in a multi-layer optical disc including three or more information recording surfaces, a spacing between an information recording surface having the largest light transmitting layer thickness and the one having the smallest light transmitting layer thickness has to be larger than in conventional two-layer discs.

Accordingly, at the time of recording or reproducing information on or from such a multi-layer optical disc, a created third-order spherical aberration increases in proportion to a deviation from an optimal light transmitting layer thickness of the objective lens. Thus, in an optical head for multi-layer optical discs, a movable range of a collimator lens needs to be larger than in conventional optical heads so as to be able to correct a larger third-order spherical aberration.

In the conventional optical head 140 shown in FIG. 20, the blue-violet laser light incident on the wedge-shaped mirror 115 is made non-parallel (divergent or convergent) by moving the collimator lens 104 in the optical axis direction in order to correct a third-order spherical aberration created according to the light transmitting layer thickness at the time of recording or reproducing information on or from the BD 90. Thus, the amount of third-order astigmatism of the blue-violet laser light having passed through the wedge-shaped mirror 115 changes.

FIG. 21 is a graph chart of a calculation result showing how the third-order astigmatism changed for each apex α of the wedge-shaped mirror 115 when the collimator lens was moved according to the light transmitting layer thickness. In FIG. 21, a horizontal axis represents the light transmitting layer thickness and a vertical axis represents the amount of third-order astigmatism. In FIG. 21, a graph 201 indicates a change of third-order astigmatism in relation to the light transmitting layer thickness when the apex α is +0.1°, a graph 202 indicates a change of third-order astigmatism in relation to the light transmitting layer thickness when the apex α is +0.06°, a graph 203 indicates a change of third-order astigmatism in relation to the light transmitting layer thickness when the apex α is 0°, a graph 204 indicates a change of third-order astigmatism in relation to the light transmitting layer thickness when the apex α is −0.06°, and a graph 205 indicates a change of third-order astigmatism in relation to the light transmitting layer thickness when the apex α is −0.1°. Calculation conditions were as follows.

| | |
|---|---|
| Designed wavelength of the objective lens: | 405 nm |
| Designed light transmitting layer thickness of the objective lens: | 87.5 μm |
| Focal length of the objective lens: | 1.3 mm |
| Numerical aperture (NA) of the objective lens: | 0.855 |
| Thickness of the wedge-shaped mirror: | 1.0 mm |
| Refractive index of the wedge-shaped mirror: | 1.53 |

It can be understood from FIG. 21 that the amount of third-order astigmatism created when the collimator lens was moved according to the light transmitting layer thickness changed depending on the apex α of the wedge-shaped mirror 115, through which the laser light passed, and was minimum when the apex α of the wedge-shaped mirror 115 was 0°, i.e. an incident surface and a reflecting surface were parallel.

Accordingly, if the wedge-shaped reflecting mirror is used to suppress the interference of the laser light caused by internal reflection as in the conventional optical head 140 of FIG. 20, the movable range of the collimator lens needs to be increased particularly for multi-layer optical discs including three or more information recording surfaces. Therefore, there is a problem that the change in the amount of third-order astigmatism considerably increases.

It is known that an amount of third-order coma aberration caused by disc tilt and that caused by the inclination of the objective lens (hereinafter, also referred to as lens tilt) respectively change according to the light transmitting layer thickness of the optical disc when the light transmitting layer thickness changes. The amount of third-order coma aberration created when the optical disc is inclined by a specified angle (at the time of disc tilt) increases in proportion to the light transmitting layer thickness. Further, the amount of third-order coma aberration created when the objective lens is inclined by a specified angle (at the time of lens tilt) decreases as the light transmitting layer thickness increases.

Thus, in the case of recording or reproducing information on or from an information recording surface having a large light transmitting layer thickness, the objective lens has to be largely inclined to correct a third-order coma aberration caused by the disc tilt. However, generally speaking, a third-order astigmatism is created according to the inclination of the objective lens if the objective lens is inclined.

FIG. 22 is a diagram showing the arrangement of the optical head in a conventional optical disc device. FIG. 23 is a diagram showing a state when the optical head accesses an inner circumferential side and an outer circumferential side of an optical disc in the conventional optical disc device.

In the general optical disc device, the optical head is arranged such that an optical axis of the collimator lens 104 and a tangential direction to an optical disc (DVD 70, CD 80 or BD 90) coincide as shown in FIG. 22. As shown in FIG. 22, laser light incident in the tangential direction of the optical disc is reflected in a direction perpendicular to an information recording surface of the optical disc by a wedge-shaped mirror 115 and a flat-plate mirror 105 and focused on the information recording surface of the optical disc by the objective lens 108 or the compatible objective lens 118. By arranging in this way, an access to the innermost circumferential side of the optical disc becomes easier and a projecting mount of the optical head from the outer circumferential side of the optical disc when the optical head accesses the outermost circumferential side of the optical disc becomes smaller as shown in FIG. 23.

However, if the optical head is arranged such that the optical axis of the collimator lens and the tangential direction of the optical disc coincide, a first third-order astigmatism created when the collimator lens is moved in the optical axis direction to correct a third-order spherical aberration and a second third-order astigmatism created when the objective lens is inclined in the radial direction of the optical disc to correct a third-order coma aberration have the same direction component (0°/90° direction) and the same polarity.

As described above, both first third-order astigmatism and second third-order astigmatism increase at the time of recording or reproducing information on or from the information recording surface having a large light transmitting layer thickness. Thus, particularly in the optical head for multi-layer optical discs including three or more information recording surfaces, the recording or reproduction of information may be largely influenced by the addition of the first and second third-order astigmatisms.

SUMMARY OF THE INVENTION

In view of the above problems, an object of the present invention is to provide an optical head, an optical disc device and an information processing device capable of suppressing the amount of third-order astigmatism created upon recording or reproducing information on or from a multi-layer optical disc including at least three information recording surfaces.

Another object of the present invention is to provide an optical head, an optical disc device and an information processing device capable of accurately controlling the laser power of laser light emitted from a light source.

One aspect of the present invention is directed to an optical head for recording or reproducing information on or from a first information recording medium including at least three information recording surfaces having different light transmitting layer thicknesses, comprising a first light source for emitting first laser light having a first wavelength; a first mirror for reflecting and transmitting the first laser light at a specified ratio; a first objective lens for focusing the first laser light reflected by the first mirror on a specified information recording surface of the first information recording medium; a coupling lens arranged between the first light source and the first mirror; a second mirror in the form of a parallel plate arranged between the coupling lens and the first mirror; a spherical aberration corrector for correcting a third-order spherical aberration created according to the light transmitting layer thickness of the first information recording medium by moving the coupling lens in an optical axis direction; and a photodetector for receiving reflected light from the information recording surface of the first information recording medium; wherein the first objective lens is so designed as to satisfy a relationship of $tc > (t0+tn)/2$ when it is assumed that $t0$ denotes the thickness of a light transmitting layer from the outer surface of the first information recording medium to an information recording surface L0 having the largest light transmitting layer thickness, $tn$ denotes the thickness of a light transmitting layer from the outer surface of the first information recording medium to an information recording surface Ln having the smallest light transmitting layer thickness and $tc$ denotes the thickness of a virtual light transmitting layer at which the absolute value of a third-order spherical aberration is minimum when the first laser light is incident as parallel light on the first objective lens.

According to the present invention, a movable range of the coupling lens at a side closer to the first objective lens than a neutral position where the absolute value of the third-order spherical aberration is minimum when the first laser light is incident as parallel light on the first objective lens is wider than that of the coupling lens at a side closer to the first light source than the neutral position at the time of recording or reproducing information on or from a multi-layer optical disc. Thus, the amount of third-order astigmatism created upon recording or reproducing information on or from a multi-layer optical disc including at least three information recording surfaces can be suppressed.

BRIEF DESCRIPTION OF THE DRAWINGS

FIG. 4A is a diagram showing emergent light when a collimator lens is at a reference position, FIG. 4B is a diagram showing the emergent light when the collimator lens is moved toward a light source side, FIG. 4C is a diagram showing the emergent light when the collimator lens is moved toward an objective lens side.

DETAILED DESCRIPTION OF THE PREFERRED
EMBODIMENTS OF THE INVENTION

Hereinafter, an optical head, an optical disc device and an information processing device according to embodiments of the present invention are described with reference to the drawings. The following embodiments are specific examples of the present invention and not of the nature to limit the technical scope of the present invention.
(First Embodiment)

Figure 1:
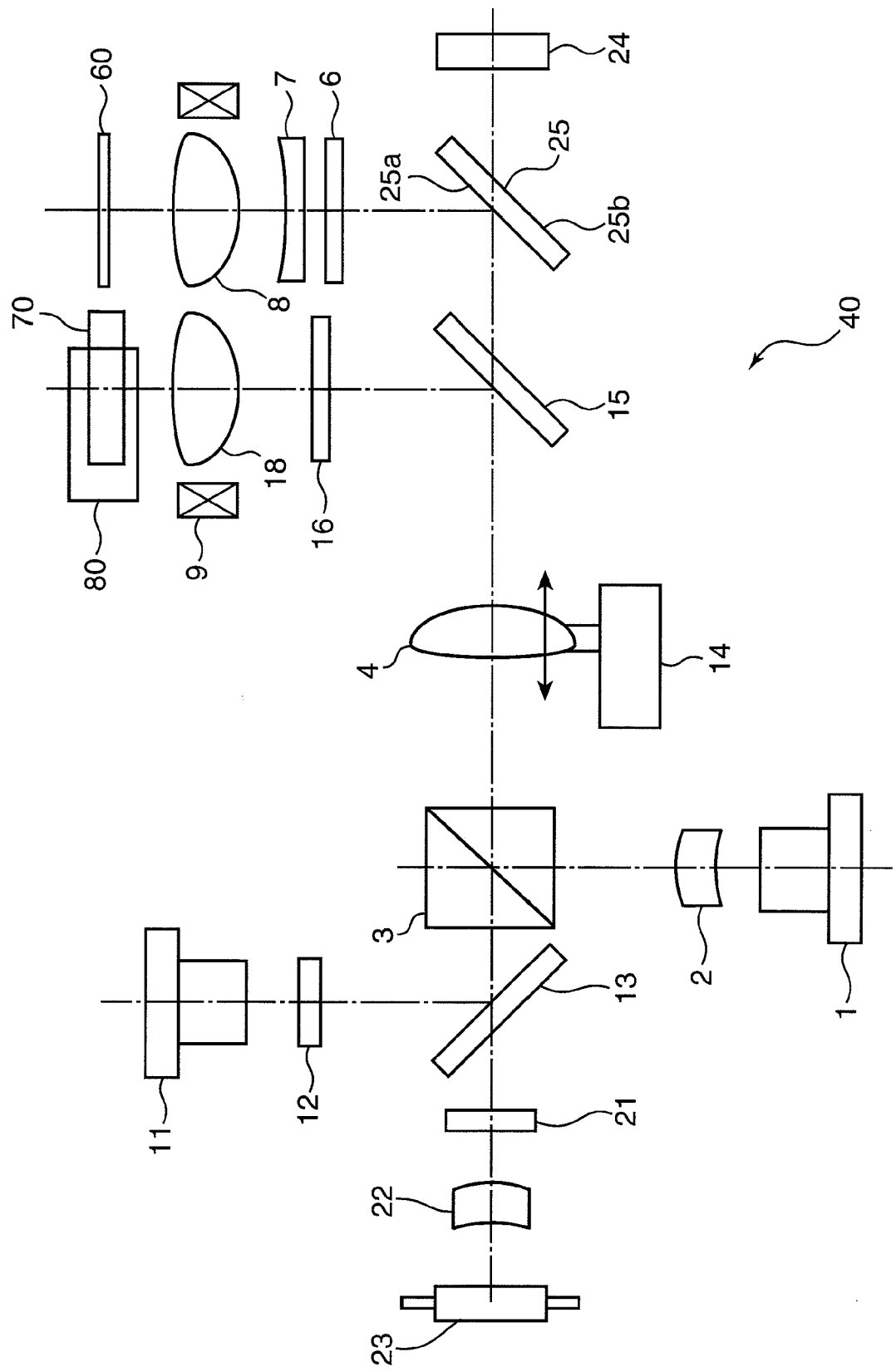
FIG. 1 is a diagram showing a schematic construction of an optical head according to a first embodiment of the invention.
Figure 2:
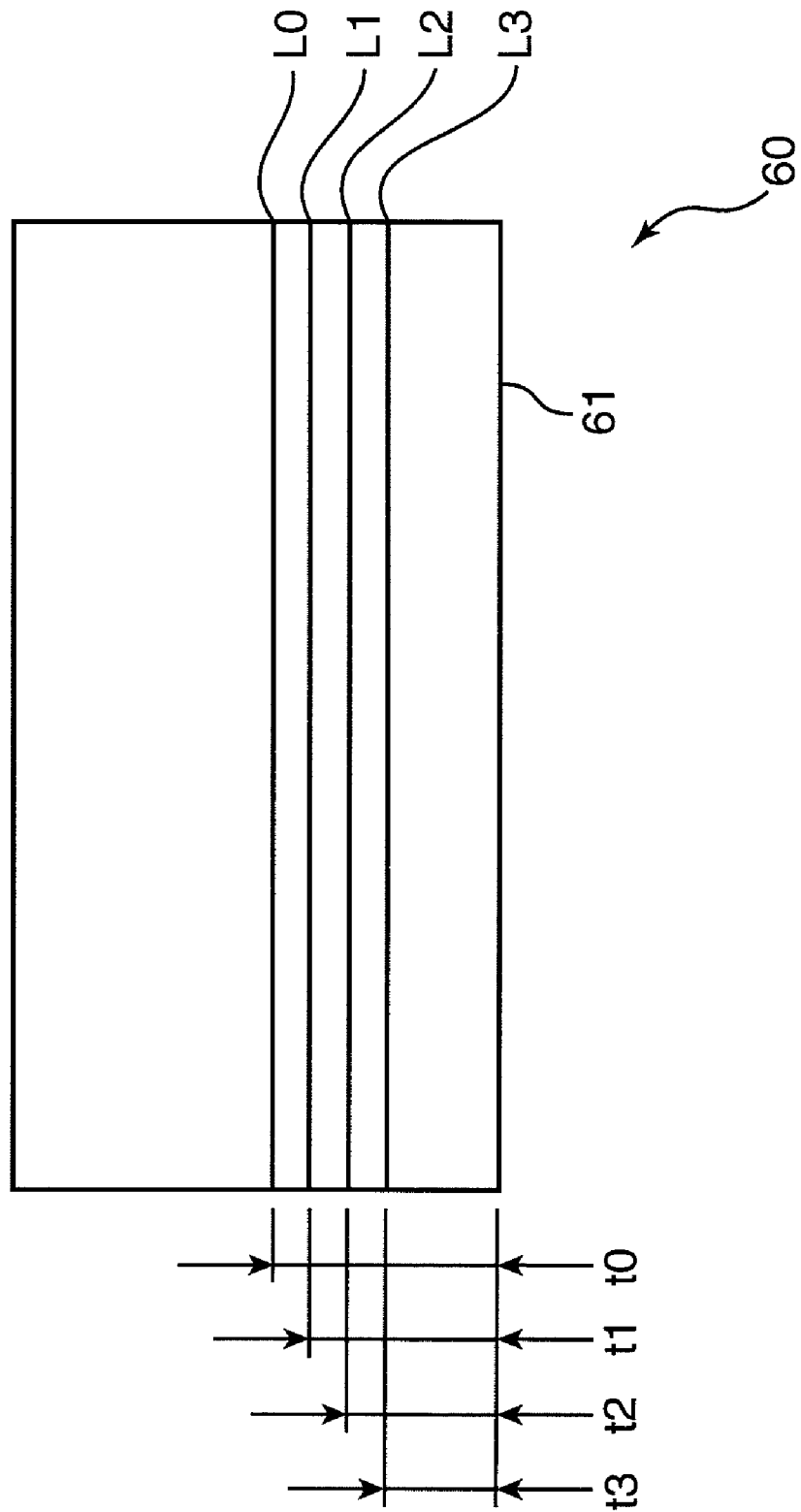
FIG. 2 is schematic construction diagram of a multi-layer optical disc according to the first embodiment of the invention.

FIG. 1 is a diagram showing a schematic construction of an optical head according to a first embodiment of the present invention, and FIG. 2 is a diagram showing a schematic construction of a multi-layer optical disc according to the first embodiment of the present invention.

In FIG. 1, an optical head 40 is provided with a blue-violet laser light source 1 for emitting blue-violet laser light, a relay lens 2, a polarization beam splitter 3, a collimator lens 4, a diffraction-grating fitted mirror 25, a quarter-wave plate 6, a diffractive lens 7, an objective lens 8, an objective lens actuator 9, a two-wavelength laser light source 11 for emitting red laser light and infrared laser light, a diffraction grating 12, a flat-plate beam splitter 13, a collimator lens actuator 14, a flat-plate mirror 15, a quarter-wave plate 16, a compatible objective lens 18, a detection hologram 21, a detection lens 22, a light receiving element 23 and a front monitor sensor 24.

A multi-layer optical disc 60 includes four information recording surfaces L0 to L3 as shown in FIG. 2. Thickness t0 of a light transmitting layer of the information recording surface L0 is, for example, 100 µm; thickness t1 of a light transmitting layer of the information recording surface L1 is, for example, 83 µm; thickness t2 of a light transmitting layer of the information recording surface L2 is, for example, 62 µm: and thickness t3 of a light transmitting layer of the information recording surface L3 is, for example, 50 µm.

In this specification, the light transmitting layer indicates a layer from the information recording surface to a light incident surface 61. Thus, the thickness of the light transmitting layer of the information recording surface indicates a distance from the information recording surface to the light incident surface 61.

The optical head 40 records or reproduces information on or from the multi-layer optical disc 60 including at least three information recording surfaces having different light transmitting layer thicknesses. The blue-violet laser light source 1 emits blue-violet laser light having a first wavelength λ1 (e.g. about 405 nm). The two-wavelength laser light source 11 emits red laser light having a second wavelength λ2 (e.g. 660 nm) longer than the first wavelength λ1 and infrared laser light having a third wavelength λ3 (e.g. about 785 nm) longer than the second wavelength λ2.

The diffraction-grating fitted mirror 25 substantially reflects the blue-violet laser light. The diffraction-grating fitted mirror 25 is in the form of a parallel plate and transmits and reflects the blue-violet laser light at a specified ratio. The objective lens 8 focuses the blue-violet laser light reflected by the diffraction-grating fitted mirror 25 on a specified information recording surface of the multi-layer optical disc 60. The objective lens actuator 9 inclines at least the objective lens 8 in a radial direction of the multi-layer optical disc 60.

The collimator lens 4 is arranged between the blue-violet laser light source 1 and the diffraction-grating fitted mirror 25. A tangential direction of the multi-layer optical disc 60 orthogonal to the radial direction of the multi-layer optical disc 60 and an optical axis of the collimator lens 4 are substantially parallel. The flat-plate mirror 15 is in the form of a parallel plate arranged between the collimator lens 4 and the diffraction-grating fitted mirror 25. The flat-plate mirror 15 substantially transmits the blue-violet laser light and substantially reflects the red laser light and the infrared laser light. In other words, the flat-plate mirror 15 transmits and reflects the red laser light and the infrared laser light at a specified ratio.

The blue-violet laser light source 1 is so arranged that the blue-violet laser light emitted therefrom is incident as P-polarized light on the flat-plate mirror 15. Further, the collimator lens 4 is arranged between the blue-violet laser light source 1 and the diffraction-grating fitted mirror 25 and between the two-wavelength laser light source 11 and the flat-plate mirror 15.

The compatible objective lens 18 focuses the red laser light reflected by the flat-plate mirror 15 on a specified information recording surface of a DVD different from the multi-layer optical disc 60 and focuses the infrared laser light reflected by the flat-plate mirror 15 on a specified information recording surface of a CD 80 different from the multi-layer optical disc 60 and the DVD 70.

The collimator lens actuator 14 corrects a third-order spherical aberration created according to the light transmitting layer thickness of the multi-layer optical disc 60 by moving the collimator lens 4 in an optical axis direction.

Also, the collimator lens actuator 14 moves the collimator lens 4 to make the red laser light incident on the compatible objective lens 18 convergent at the time of recording or reproducing information on or from the DVD 70. Further, the collimator lens actuator 14 moves the collimator lens 4 in the optical axis direction within such a range as to make the red laser light incident on the compatible objective lens 18 convergent at the time of recording or reproducing information on or from the DVD 70, thereby correcting a spherical aberration created according to the thickness of a light transmitting layer of the DVD 70.

Furthermore, the collimator lens actuator 14 moves the collimator lens 4 to make the infrared laser light incident on the compatible objective lens 18 convergent at the time of recording or reproducing information on or from the CD 80. The collimator lens actuator 14 may move the collimator lens 4 to make the infrared light incident on the compatible objective lens 18 divergent at the time of recording or reproducing information on or from the CD 80.

The light receiving element 23 receives reflected light from the information recording surfaces of the multi-layer optical disc 60. The front monitor sensor 24 receives the blue-violet laser light having passed through the flat-plate mirror 15 and the diffraction-grating fitted mirror 25 and generates an auto power control signal for controlling the output of the blue-violet laser light source 1 based on the received blue-violet laser light. Further, the front monitor sensor 24 receives the red laser light or infrared laser light having passed through the flat-plate mirror 15 and the diffraction-grating fitted mirror 25 and generates an auto power control signal for controlling the output of the two-wavelength laser light source 11 based on the received red or infrared laser light.

Next, the operation of the optical head 40 in the case of recording or reproducing information on or from the multi-layer optical disc 60 is described. Blue-violet laser light having a wavelength of 405 nm and emitted from the blue-violet laser light source 1 is converted into divergent light having a different NA by the relay lens 2 and incident as S-polarized light on the polarization beam splitter 3. The blue-violet laser light reflected by the polarization beam splitter 3 is converted into substantially parallel light by the collimator lens 4 and passes through the flat-plate mirror 15 to be incident on the diffraction-grating fitted mirror 25. A part of the blue-violet laser light incident on the diffraction-grating fitted mirror 25 is reflected toward the quarter-wave plate 6. The other part of the blue-violet laser light incident on the diffraction-grating fitted mirror 25 is incident on the front monitor sensor 24 after passing through the diffraction-grating fitted mirror 25. Then, the output of the blue-violet laser light source 1 is controlled based on the output of the front monitor sensor 24.

On the other hand, the blue-violet laser light reflected by the diffraction-grating fitted mirror 25 passes through the diffractive lens 7 after being converted into circularly polarized light by the quarter-wave plate 6. The blue-violet laser light having passed through the diffractive lens 7 is focused as a light spot on any one of the information recording surfaces L0 to L3 of the multi-layer optical disc 60 by the objective lens 8.

The blue-violet laser light reflected by the specified information recording surface of the multi-layer optical disc 60 is reflected by the diffraction-grating fitted mirror 25 after passing through the objective lens 8 and the diffractive lens 7 again and being converted into linearly polarized light different from the one on an outward path by the quarter-wave plate 6. The blue-violet laser light reflected by the diffraction-grating fitted mirror 25 is incident as P-polarized light on the polarization beam splitter 3 after passing through the flat-plate mirror 15 and the collimator lens 4. The blue-violet laser light having passed through the polarization beam splitter 3 is introduced to the light receiving element 23 via the detection hologram 21 and the detection lens 22. The blue-violet laser light detected by the light receiving element 23 is photoelectrically converted. A signal generated by the photoelectric conversion is calculated by an unillustrated controller to generate a focus error signal used to follow a surface runout of the multi-layer optical disc 60 and a tracking error signal used to follow the eccentricity of the multi-layer optical disc 60.

Next, the operation of the optical head 40 in the case of recording or reproducing information on or from the DVD 70 is described. Red laser light having a wavelength of 660 nm and emitted from the two-wavelength laser light source 11 is separated into a main beam as $0^{th}$-order light and sub beams as $\pm 1^{st}$-order diffracted light by the diffraction grating 12. The main beam and the sub beams are incident as S-polarized light on the flat-plate beam splitter 13, reflected by the flat-plate beam splitter 13 and passes through the polarization beam splitter 3. The red laser light having passed through the polarization beam splitter 3 is converted into convergent light by the collimator lens 4 and incident on the flat-plate mirror 15. A part of the red laser light incident on the flat-plate mirror 15 is reflected toward the quarter-wave plate 16. The other part of the red laser light incident on the flat-plate mirror 15 is incident on the front monitor sensor 24 after passing through the flat-plate mirror 15 and the diffraction-grating fitted mirror 25. Then, the output of the red laser light of the two-wavelength laser light source 11 is controlled based on the output of the front monitor sensor 24.

On the other hand, the red laser light reflected by the flat-plate mirror 15 is focused as a light spot on an information recording surface of the DVD 70 by the compatible objective lens 18 after being converted into circularly polarized light by the quarter-wave plate 16.

The red laser light reflected by the information recording surface of the DVD 70 is reflected by the flat-plate mirror 15 after passing through the compatible objective lens 18 again and being converted into linearly polarized light different from the one on an outward path by the quarter-wave plate 16. The red laser light reflected by the flat-plate mirror 15 is incident as P-polarized light on the polarization beam splitter 3 and the flat-plate beam splitter 13 after passing through the collimator lens 4. The red laser light having passed through the polarization beam splitter 3 and the flat-plate beam splitter 13 is introduced to the light receiving element 23 via the detection hologram 21 and the detection lens 22. The red laser light detected by the light receiving element 23 is photoelectrically converted. A signal generated by the photoelectric conversion is calculated by the unillustrated controller to generate a focus error signal used to follow a surface runout of the DVD 70 and a tracking error signal used to follow the eccentricity of the DVD 70.

Next, the operation of the optical head 40 in the case of recording or reproducing information on or from the CD 80 is described. Infrared laser light having a wavelength of 785 nm and emitted from the two-wavelength laser light source 11 is separated into a main beam as $0^{th}$-order light and sub beams as $\pm 1^{st}$-order diffracted light by the diffraction grating 12. The main beam and the sub beams are reflected by the flat-plate beam splitter 13 and pass through the polarization beam splitter 3. The infrared laser light having passed through the polarization beam splitter 3 is converted into divergent light having a different NA by the collimator lens 4 and incident on the flat-plate mirror 15. A part of the infrared laser light incident on the flat-plate mirror 15 is reflected toward the quarter-wave plate 16. The other part of the infrared laser light incident on the flat-plate mirror 15 is incident on the front monitor sensor 24 after passing through the flat-plate mirror 15 and the diffraction-grating fitted mirror 25. Then, the output of the infrared laser light of the two-wavelength laser light source 11 is controlled based on the output of the front monitor sensor 24.

On the other hand, the infrared laser light reflected by the flat-plate mirror 15 is focused as a light spot on an information recording surface of the CD 80 by the compatible objective lens 18 after passing through the quarter-wave plate 16.

The infrared laser light reflected by the information recording surface of the CD 80 is reflected by the flat-plate mirror 15 after passing through the compatible objective lens 18 and the quarter-wave plate 16 again. The infrared laser light reflected by the flat-plate mirror 15 passes through the polarization beam splitter 3 and the flat-plate beam splitter 13 after passing through the collimator lens 4. The infrared laser light having passed through the polarization beam splitter 3 and the flat-plate beam splitter 13 is introduced to the light receiving element 23 via the detection hologram 21 and the detection lens 22. The infrared laser light detected by the light receiving element 23 is photoelectrically converted. A signal generated by the photoelectric conversion is calculated by a controller to be described later to generate a focus error signal used to follow a surface runout of the CD 80 and a tracking error signal used to follow the eccentricity of the CD 80.

In the first embodiment, the multi-layer optical disc 60 corresponds to an example of a first information recording medium; the blue-violet laser light to an example of first laser light; the blue-violet laser light source 1 to an example of a first light source; the diffraction-grating fitted mirror 25 to an example of a first mirror and a first parallel-plate mirror; the objective lens 8 to an example of a first objective lens; the collimator lens 4 to an example of a coupling lens; the flat-plate mirror 15 to an example of a second mirror and a second parallel-plate mirror; the collimator lens actuator 14 to an example of a spherical aberration corrector and a lens driver; the light receiving element 23 to an example of a photodetector; the red laser light to an example of second laser light; the infrared laser light to an example of third laser light: the two-wavelength laser light source 11 to an example of a second light source and a third light source; the DVD 70 to an example of a second information recording medium; the compatible objective lens 18 to an example of a second objective lens; the objective lens actuator 9 to an example of a lens incliner; the front monitor sensor 24 to an example of a front photodetector; and the CD 80 to an example of a third information recording medium.

Next, the detection of the focus error signal and that of the tracking error signal in the optical head of the first embodiment are described.

The focus error signal used to follow the surface runout of the multi-layer optical disc 60 is detected by a so-called astigmatism method for detecting a focused spot having astigmatism given by the detection lens 22 by a four-divided light receiving pattern in the light receiving element 23 or a like method.

On the other hand, the tracking error signal used to follow the eccentricity of the multi-layer optical disc 60 is generated by detecting $0^{th}$ order light and $\pm 1^{st}$-order diffracted light generated when light passes through the detection hologram 21 using a specified light receiving area of the light receiving element 23. This enables the suppression of a variation of the tracking error signal caused when the position, width and depth of an information track groove formed in the multi-layer optical disc 60 vary and a variation of the tracking error signal caused when information is recorded on the information track to change a reflectance. Further, it is also possible to avoid the incidence of unnecessary light (stray light) reflected by the information recording surface different from the one where information is recorded or reproduced on the light receiving area for detecting the tracking error signal.

The detections of the focus error signal and the tracking error signal are not limited to these detection methods. For example, a differential push-pull method (DPP method) using a main beam and sub beams generated by a diffraction grating or a like method can be used to detect the tracking error signal.

The focus error signals used to follow the surface runouts of the DVD 70 and the CD 80 are also detected by the so-called astigmatism method for detecting a focused spot having astigmatism given by the detection lens 22 by the four-divided light receiving pattern in the light receiving element 23 or a like method.

On the other hand, the tracking error signals used to follow the eccentricities of the DVD 70 and the CD 80 are detected by a so-called three-beam method using a main beam and sub beams generated by the diffraction grating 12, a differential push-pull method (DPP method) or a like method.

Next, the objective lens actuator in this first embodiment is described.

In the objective lens actuator 9, an objective lens holder (movable portion) for holding the objective lens 8 is supported by a plurality of suspension wires. The objective lens actuator 9 drives the objective lens 8 and the compatible objective lens 18 in two axial directions (focusing direction and tracking direction) based on the focus error signal and the tracking error signal so that a light spot follows the information track of the rotating multi-layer optical disc 60, DVD 70 or CD 80.

The objective lens actuator 9 can also incline the objective lens 8 and the compatible objective lens 18 in a radial direction of the multi-layer optical disc 60, DVD 70 or CD 80 in addition to displacing them in the focusing direction and the tracking direction.

Next, the collimator lens actuator in the first embodiment is described. The collimator lens 4 is movable in the optical axis direction of the collimator lens 4 by the collimator lens actuator 14.

Figure 3:
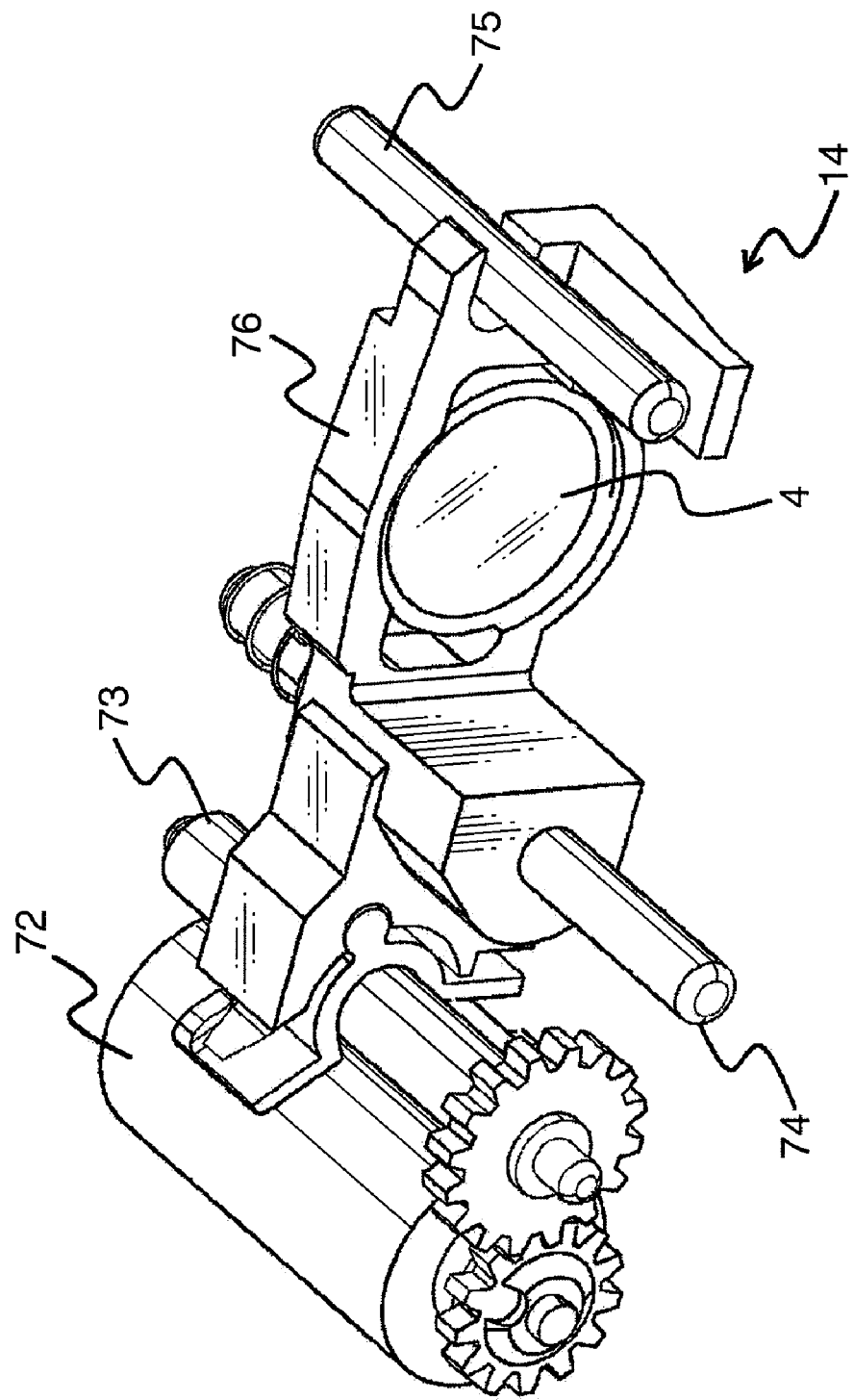
FIG. 3 is a view diagrammatically showing a schematic construction of a collimator lens actuator according to the first embodiment of the invention.

FIG. 3 is a diagram showing a schematic construction of the collimator lens actuator 14 according to the first embodiment of the present invention. In FIG. 3, the collimator lens actuator 14 includes a stepping motor 72, a screw shaft 73, a main shaft 74, a countershaft 75 and a lens holder 76. By driving the stepping motor 72 to rotate the screw shaft 73, the lens holder 76 holding the collimator lens 4 moves in the optical axis direction of the collimator lens 4 along the main shaft 74 and the counter shaft 75.

FIG. 4A is a diagram showing emergent light when the collimator lens is at a reference position, FIG. 4B is a diagram showing the emergent light when the collimator lens is moved toward a light source side, and FIG. 4C is a diagram showing the emergent light when the collimator lens is moved toward an objective lens side.

As shown in FIG. 4A, the emergent light from the collimator lens 4 is substantially parallel light when the collimator lens 4 is at the reference position. On the contrary, the emergent light from the collimator lens 4 becomes divergent light by moving the collimator lens 4 from the reference position toward the light source side as shown in FIG. 4B, whereby a third-order spherical aberration created when the light transmitting layer of the multi-layer optical disc 60 becomes thicker can be corrected.

On the other hand, the emergent light from the collimator lens 4 becomes convergent light by moving the collimator lens 4 from the reference position toward the objective lens side as shown in FIG. 4C, whereby a third-order spherical aberration created when the light transmitting layer of the multi-layer optical disc 60 becomes thinner can be corrected. In other words, in the multi-layer optical disc 60 including a plurality of information recording surfaces, a third-order spherical aberration can be corrected by moving the collimator lens 4 according to the light transmitting layer thickness of each information recording surface.

The construction of the collimator lens actuator 14 for moving the collimator lens 4 in the optical axis direction is not limited to the one using the stepping motor 72 as shown in FIG. 3. Any construction such as an actuator operated, for example, by driving a magnetic circuit or a piezoelectric element can be employed. In the construction using the stepping motor 72 shown in FIG. 3, the position of the collimator lens 4 in the optical axis direction needs not be monitored, wherefore a system can be simplified. On the other hand, since the actuator operated by the magnetic circuit or the piezoelectric element has a small driving part, it is suitable for the miniaturization of the optical head.

Next, the objective lens in this first embodiment is described. Design conditions of the objective lens 8 of the first embodiment are, for example, as follows. Specifically, a designed wavelength is 405 nm, a designed light transmitting layer thickness is 80 µm, a focal length is 1.3 mm; a numerical aperture (NA) is 0.855, and a working distance is 0.3 mm. The designed light transmitting layer thickness indicates the thickness of a virtual light transmitting layer at which the absolute value of a third-order spherical aberration is minimum (0) when parallel light is incident on the objective lens.

The objective lens 8 of the first embodiment has the designed light transmitting layer thickness of 80 µm. Thus, in the case of focusing laser light on the information recording surface L0 having the light transmitting layer thickness of 100 µm and the information recording surface L1 having the light transmitting layer thickness of 83 µm, divergent light is caused to be incident on the objective lens 8 by moving the collimator lens 4 from the reference position to the light source side. In this way, a third-order spherical aberration created due to a deviation of the light transmitting layer thickness from the designed light transmitting layer thickness is corrected. On the other hand, in the case of focusing laser light on the information recording surface L2 having the light transmitting layer thickness of 62 μm and the information recording surface L3 having the light transmitting layer thickness of 50 μm, convergent light is caused to be incident on the objective lens 8 by moving the collimator lens 4 from the reference position to the objective lens side. In this way, a third-order spherical aberration created due to a deviation of the light transmitting layer thickness from the designed light transmitting layer thickness is corrected.

Here, the amount of third-order coma aberration created when the optical disc is inclined by a specified angle (at the time of disc tilt) increases in proportion to the light transmitting layer thickness, whereas the amount of third-order coma aberration created when the objective lens is inclined by a specified angle (at the time of lens tilt) decreases with an increase in the light transmitting layer thickness.

Figure 5:
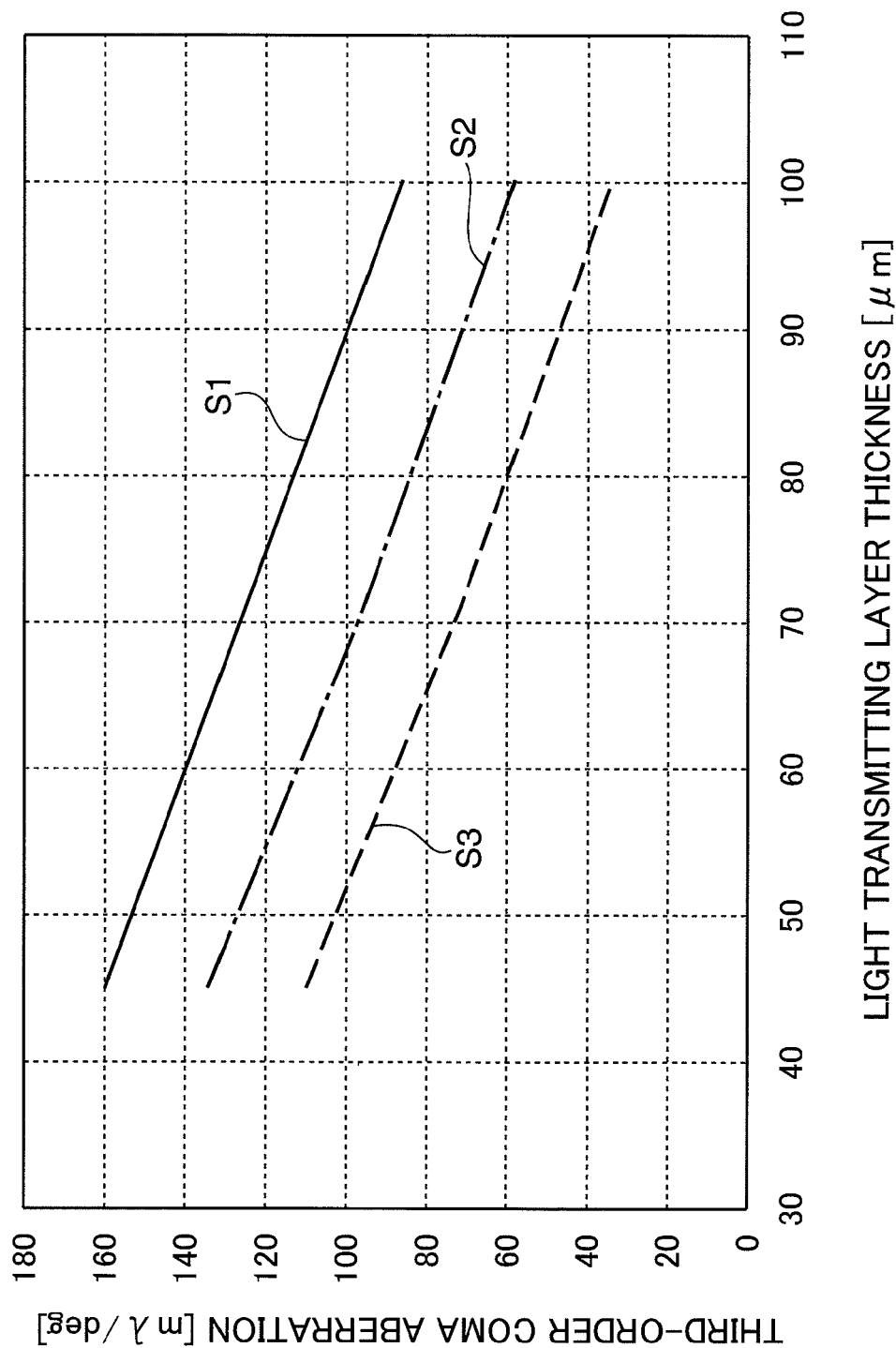
FIG. 5 is a graph chart showing a third-order coma aberration created when the objective lens is inclined by 1.0° and light transmitting layer thickness for three types of objective lenses.

FIG. 5 is a graph chart showing a relationship between the third-order coma aberration created when the objective lens is inclined by 1.0° and the light transmitting layer thickness for three types of objective lenses. Three types of objective lenses S1 to S3 were so designed that the amounts of third-order coma aberration created when the objective lenses were inclined by 1.0° were respectively different when the light transmitting layer thickness was 80 μm. In FIG. 5, a horizontal axis represents the light transmitting layer thickness and a vertical axis represents the amount of third-order coma aberration created when the objective lens was inclined by 1.0° (at the time of the lens tilt of 1.0°).

The light transmitting layer thickness was 80 μm, the lens tilt was 1.0° and the amount of third-order coma aberration created in the case of using the objective lens S1 was designed to be 113 mλ. On the same conditions, the amount of third-order coma aberration created in the case of the objective lens S2 was designed to be 84 mλ and the amount of third-order coma aberration created in the case of the objective lens S3 was designed to be 61 mλ.

It can be understood from FIG. 5 that the amount of third-order coma aberration created by the lens tilt decreases with an increase in the light transmitting layer thickness and linearly changes in relation to the light transmitting layer thickness.

For example, in the objective lens S1, the third-order coma aberration created when the lens tilt is 1.0° is 146 mλ when the light transmitting layer thickness is 55 μm, 113 mλ when the light transmitting layer thickness is 80 μm, and 87 mλ when the light transmitting layer thickness is 100 μm.

It can be also understood from FIG. 5 that a change in the amount of third-order coma aberration when the light transmitting layer thickness changes is constant regardless of the design of the objective lens since the inclinations of the respective graphs of the objective lenses S1 to S3 are constant.

Figure 6:
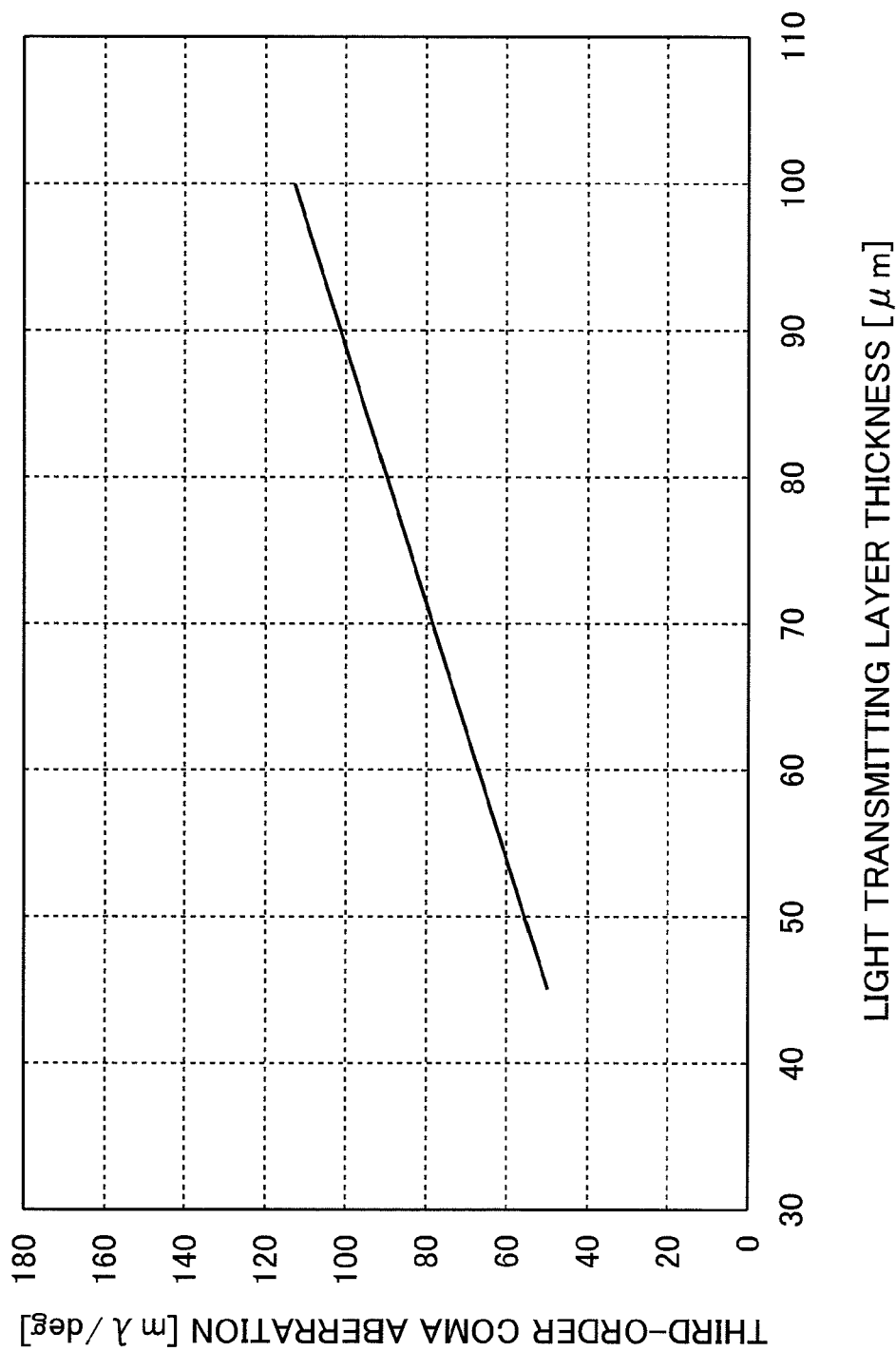
FIG. 6 is a graph chart showing a third-order coma aberration created when the multi-layer optical disc is inclined by 1.0° and the light transmitting layer thickness.

FIG. 6 is a graph chart showing a relationship between the amount of third-order coma aberration created when the multi-layer optical disc 60 was inclined by 1.0°, i.e. the disc tilt was 1.0°, and the light transmitting layer thickness. In FIG. 6, a horizontal axis represents the light transmitting layer thickness and a vertical axis represents the amount of third-order coma aberration created when the multi-layer optical disc 60 was inclined by 1.0°. As shown in FIG. 6, the amount of third-order coma aberration created by the disc tilt increases in proportion to the light transmitting layer thickness.

It can be understood from FIGS. 5 and 6 that a lens tilt amount necessary to correct a third-order coma aberration created when the multi-layer optical disc 60 is inclined by a specified angle suddenly increases with the light transmitting layer thickness. For example, when the light transmitting layer thickness is 100 μm, the objective lenses S1 and S2 need to be respectively inclined by 0.32° and by 0.48°, but the objective lens S3 needs to be inclined by 0.81° in order to correct a third-order coma aberration created when the multi-layer optical disc 60 is inclined by 0.25°.

Figure 7:
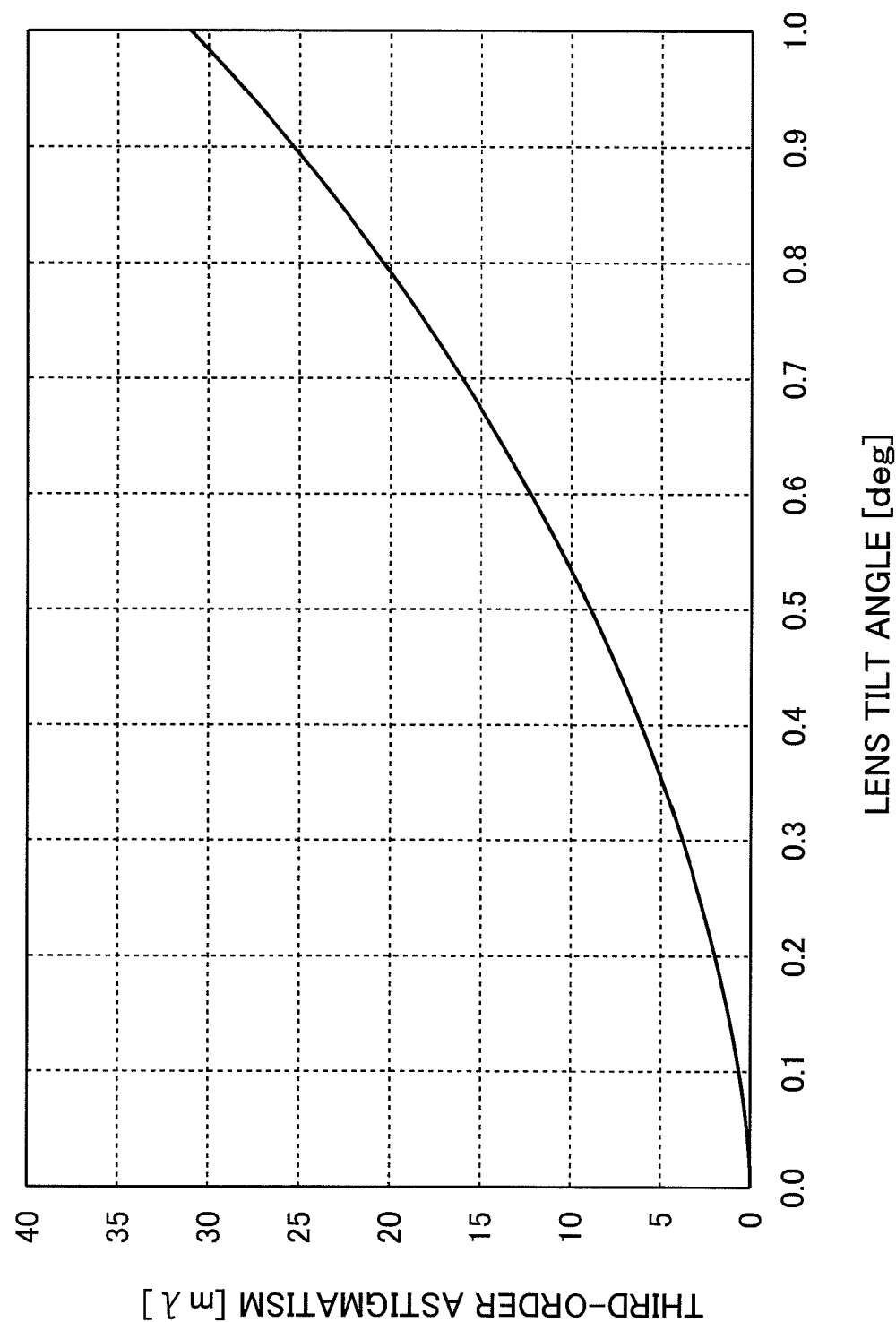
FIG. 7 is a graph chart showing a third-order astigmatism created at the time of lens tilt and a lens tilt angle, FIG. 8 are diagrams showing movable ranges of the collimator lens at the time of recording or reproducing information on a CD, a DVD and the multi-layer optical disc in the optical disc according to the first embodiment, FIG. 9 are diagrams showing comparative examples used to explain the movable ranges of the collimator lens 4 in the optical disc 40 of the first embodiment.

Here, not only the third-order coma aberration, but also the third-order astigmatism is created when the objective lens is inclined. The third-order astigmatism created by the lens tilt is substantially uniquely determined by the focal length and the working distance. FIG. 7 is a graph chart showing a relationship between the amount of third-order astigmatism created at the time of lens tilt and a lens tilt angle in the objective lens having the above design conditions. In FIG. 7, a horizontal axis represents the lens tilt angle and a vertical axis represents the amount of third-order astigmatism. FIG. 7 shows that the third-order astigmatism suddenly increases with the lens tilt angle. For example, if the lens tilt angle exceeds 0.5°, the third-order astigmatism reaches 10 mλ. In the information recording surface having a large light transmitting layer thickness, the inclination amount of the objective lens (lens tilt amount) increases to correct the third-order coma aberration created by the disc tilt, wherefore the influence of the third-order astigmatism cannot be ignored.

On the other hand, in the information recording surface having a small light transmitting layer thickness, the lens tilt amount for correcting the third-order coma aberration created when the multi-layer optical disc 60 is inclined by a specified angle can be small. For example, when the light transmitting layer thickness is 50 μm, it is sufficient to incline the objective lens S1 by 0.09°, incline the objective lens S2 by 0.11° and incline the objective lens S3 by 0.14° in order to correct a third-order coma aberration created when the multi-layer optical disc 60 is inclined by 0.25°.

However, if the objective lens is inclined more than supposed due to a lens tilt control error at the time of correcting a third-order coma aberration, the resonance of the objective lens actuator and the like, the remaining third-order coma aberration becomes considerably large in the information recording surface having a small light transmitting layer thickness. For example, in the case of a control error of ±0.2° with respect to a specified lens tilt angle, a third-order coma aberration of 31 mλ is created with the objective lens S1, a third-order coma aberration of 25 mλ is created with the objective lens S2, and a third-order coma aberration of 21 mλ is created with the objective lens S3.

From the above, factors to deteriorate the aberration differ in each information recording surface in the multi-layer optical disc 60 since the spacing between the information recording surface having the largest light transmitting layer thickness and the one having the smallest light transmitting layer thickness is very large. Accordingly, the objective lens needs to be so designed that the amount of third-order coma aberration created at the time of the lens tilt has a suitable value.

For example, an objective lens of a conventional optical head for recording or reproducing information on or from a BD including two information recording surfaces is generally so designed as to have a characteristic such as that of the objective lens S1 shown in FIG. 5. On the contrary, the objective lens 8 of the first embodiment is so designed as to have a characteristic such as that of the objective lens S2 shown in FIG. 5. By having such a design, the amount of third-order coma aberration at the time of the lens tilt in the information recording surface L3 having the smallest light transmitting layer thickness (light transmitting layer thickness t3 is 50 μm) is substantially equal to the amount of third-order coma aberration at the time of the lens tilt in the information recording surface having the smallest light transmitting layer thickness (light transmitting layer thickness t3 is 75 μm) of the conventional BD including the two information recording surfaces. Thus, in the optical head 40 of the first embodiment, the lens tilt caused by the lens tilt control error at the time of correcting a third-order coma aberration or the resonance of the objective lens actuator may be set equal to that of the conventional optical head.

The objective lens 8 of the first embodiment is so designed that the amount of third-order coma aberration created when the objective lens is inclined and that of third-order coma aberration created when an optical disc is inclined are substantially equal when laser light is focused on an information recording surface having a light transmitting layer thickness of 80 μm. The objective lens 8 is also so designed as to minimize the absolute value of third-order spherical aberration when parallel light is incident on the objective lens 8 in the case where laser light is focused on an information recording surface having a light transmitting layer thickness of 80 μm. Accordingly, the objective lens 8 of the first embodiment satisfies a sine condition at the light transmitting layer thickness of 80 μm.

Next, the compatible objective lens of the first embodiment is described.

The compatible objective lens 18 has a diffraction structure for focusing red laser light used to record or reproduce information on or from the DVD 70 or infrared laser light used to record or reproduce information on or from the CD 80 as a fine light spot utilizing a wavelength difference.

In the case of recording or reproducing information on or from the DVD 70, convergent light with a specified convergence angle is caused to be incident on the compatible objective lens 18 by moving the collimator lens 4 toward the objective lens side. Further, in the case of recording or reproducing information on or from the CD 80, divergent light with a specified divergence angle is caused to be incident on the compatible objective lens 18 by moving the collimator lens 4 toward the light source side. The compatible objective lens 18 is so designed as to minimize a third-order spherical aberration for the light transmitting layer thickness of the DVD 70 or the CD 80.

Design conditions of the compatible objective lens 18 of this embodiment are, for example, as follows. Specifically, in a DVD, a designed wavelength is 660 nm, a designed light transmitting layer thickness is 0.6 mm, a focal length is 2.0 mm, a numerical aperture (NA) is 0.66, a working distance is 1.0 mm and an object point distance is −170 mm (convergent light). In a CD, a designed wavelength is 785 nm, a designed light transmitting layer thickness is 1.2 mm, a focal length is 2.0 mm, a numerical aperture (NA) is 0.51, a working distance is 0.65 mm and an object point distance is +130 mm (divergent light).

As shown in FIG. 4A, the emergent light from the collimator lens 4 is substantially parallel light when the collimator lens 4 is at the reference position. On the contrary, as shown in FIG. 4B, the emergent light from the collimator lens 4 becomes divergent light with a specified divergence angle (specified object point distance) by moving the collimator lens 4 from the reference position to a specified position at the light source side. In this way, information is recorded or reproduced on or from the CD 80.

On the other hand, as shown in FIG. 4C, the emergent light from the collimator lens 4 becomes convergent light with a specified convergence angle (specified object point distance) by moving the collimator lens 4 from the reference position to a specified position at the objective lens side. In this way, information is recorded or reproduced on or from the DVD 70. For the DVD 70 including two information recording surfaces, a third-order coma aberration can be corrected by moving the collimator lens 4 according to the light transmitting layer thickness of each information recording surface.

Here, at the time of recording or reproducing information on or from the CD 80, the working distance (WD) of the compatible objective lens 18 can be increased by causing divergent light to be incident on the compatible objective lens 18 from the collimator lens 4, whereby the collision of the compatible objective lens 18 and the CD 80 can be suppressed. Further, at the time of recording or reproducing information on or from the CD 80 having a large light transmitting layer thickness, a part of a created third-order spherical aberration can be corrected by causing divergent light to be incident on the compatible objective lens 18 from the collimator lens 4.

On the other hand, at the time of recording or reproducing information on or from the DVD 70 having a small light transmitting layer thickness, a part of a created third-order spherical aberration can be corrected by causing convergent light to be incident on the compatible objective lens 18 from the collimator lens 4. By employing such a construction, there is an effect of being able to improve the light utilization efficiency of the compatible objective lens 18 since it is possible, for example, to increase the pitch of the diffraction structure. The working distance of the compatible objective lens 18 at the time of recording or reproducing information on or from the DVD 70 is longer than that of the compatible objective lens 18 at the time of recording or reproducing information on or from the CD 80. Thus, even if the working distance of the compatible objective lens 18 decreases by causing convergent light to be incident on the compatible objective lens 18 from the collimator lens 4, there is no substantial problem.

As described above, it is preferable to cause divergent light to be incident on the compatible objective lens 18 from the collimator lens 4 at the time of recording or reproducing information on or from the CD 80 and cause convergent light to be incident on the compatible objective lens 18 from the collimator lens 4 at the time of recording or reproducing information on or from the DVD 70 as in this first embodiment.

Next, a movable range of the collimator lens in the first embodiment is described.

FIG. 8A is a diagram showing the movable range of the collimator lens 4 at the time of recording or reproducing information on or from the CD 80 in the optical head 40 of the first embodiment, FIG. 8B is a diagram showing the movable range of the collimator lens 4 at the time of recording or reproducing information on or from the DVD 70 in the optical head 40 of the first embodiment and FIG. 8C is a diagram showing the movable range of the collimator lens 4 at the time of recording or reproducing information on or from the multi-layer optical disc 60 in the optical head 40 of the first embodiment. Neutral positions MP1, MP2 and MP3 shown by broken line in FIGS. 8A to 8C differ due to differences in the wavelengths of laser light used to record or reproduce information on or from the CD 80, the DVD 70 and the multi-layer optical disc 60.

FIG. 8A diagrammatically shows the position of the collimator lens 4 at the time of recording or reproducing information on or from the CD 80. The compatible objective lens 18 of the first embodiment is so designed as to optimize a third-order spherical aberration when divergent light with an object point distance of +130 mm is incident on the information recording surface of the CD 80 having the light transmitting layer thickness of 1.2 mm. Accordingly, divergent light with a specified divergence angle can be caused to be incident on the compatible objective lens 18 by moving the collimator lens 4 to a position P0 closer to the light source than the neutral position MP1. Since the CD 80 has a smaller numerical aperture than the DVD 70 and the multi-layer optical disc 60, information can be recorded or reproduced on or from the CD 80 with the collimator lens 4 fixed at the specified position P0.

FIG. 8B diagrammatically shows the position of the collimator lens 4 at the time of recording or reproducing information on or from the DVD 70. The compatible objective lens 18 of the first embodiment is so designed as to optimize a third-order spherical aberration when convergent light with an object point distance of −170 mm is incident on the information recording surface of the DVD 70 having the light transmitting layer thickness of 0.6 mm. Accordingly, convergent light with a specified convergence angle can be caused to be incident on the compatible objective lens 18 by moving the collimator lens 4 to a position P1 closer to the objective lens than the neutral position MP2.

The DVD 70 for practical use is a single-layer disc including a single information recording surface or a two-layer disc including two information recording surfaces. The position P1 shown in FIG. 8B indicates the position of the collimator lens 4 at the time of recording or reproducing information on or from a single-layer disc.

The two-layer disc includes information recording surfaces L1 and L0. The light transmitting layer thickness of the information recording surface L0 is about 0.58 mm, and that of the information recording surface L1 is about 0.62 mm. If the light transmitting layer thickness of the information recording surface deviates from the designed light transmitting layer thickness (0.6 mm), a third-order spherical aberration is created. Since the DVD 70 has a larger numerical aperture than the CD 80, the influence of the third-order spherical aberration cannot be ignored. Accordingly, it is preferable to move the collimator lens 4 to specified positions P2, P3 according to the light transmitting layer thickness of the information recording surface where information is to be recorded or reproduced.

Specifically, the position P2 of the collimator lens 4 at the time of recording or reproducing information on or from the information recording surface L0 of the two-layer disc having a smaller light transmitting layer thickness is located closer to the objective lens than the position P3 of the collimator lens 4 at the time of recording or reproducing information on or from the information recording surface L1 of the two-layer disc having a larger light transmitting layer thickness. The positions P1, P2 and P3 are all located closer to the objective lens than the neutral position MP2, wherein the position P1 is located between the positions P2 and P3.

FIG. 8C diagrammatically shows the position of the collimator lens 4 at the time of recording or reproducing information on or from the multi-layer optical disc 60. The objective lens 8 of the first embodiment has the designed light transmitting layer thickness of 80 μm. Thus, in the case of focusing laser light on the information recording surface L0 having the light transmitting layer thickness of 100 μm and the information recording surface L1 having the light transmitting layer thickness of 83 μm, divergent light is caused to be incident on the objective lens 8 by moving the collimator lens 4 to positions P11, P12 located closer to the light source than the neutral position MP3. On the other hand, in the case of focusing laser light on the information recording surface L2 having the light transmitting layer thickness of 62 μm and the information recording surface L3 having the light transmitting layer thickness of 50 μm, convergent light is caused to be incident on the objective lens 8 by moving the collimator lens 4 to positions P13, P14 located closer to the objective lens than the neutral position MP3. Thus, third-order spherical aberrations created due to a deviation of the light transmitting layer thickness from the designed light transmitting layer thickness can be corrected.

The position P11 of the collimator lens 4 at the time of recording or reproducing information on or from the information recording surface L0 is located closer to the light source than the position P12 of the collimator lens 4 at the time of recording or reproducing information on or from the information recording surface L1. Further, the position P14 of the collimator lens 4 at the time of recording or reproducing information on or from the information recording surface L3 is located closer to the objective lens than the position P13 of the collimator lens 4 at the time of recording or reproducing information on or from the information recording surface L2.

Since the multi-layer optical disc 60 has a considerably larger numerical aperture than the CD 80 and the DVD 70, it is preferable not only to move the collimator lens 4 according to the light transmitting layer thickness of the information recording surface, but also to correct third-order spherical aberrations created due to a thickness variation of the respective light transmitting layers, a temperature variation and the like. In the optical head 40 of the first embodiment, the movable range (light source side maximum position P15 to objective lens side maximum position P16) of the collimator lens 4 is so set as to be able to correct third-order spherical aberrations created due to the thickness variation of the light transmitting layers, the temperature variation and the like in addition to third-order spherical aberrations determined by the light transmitting layer thicknesses of the information recording surfaces L0 and L3 as shown in FIG. 8C.

The collimator lens actuator 14 moves the collimator lens 4 to the position P14 (first position) where blue-violet laser light incident on the diffraction-grating fitted mirror 25 becomes convergent light at the time of recording or reproducing information on or from the information recording surface of the multi-layer optical disc 60 having the smallest light transmitting layer thickness. The collimator lens actuator 14 also moves the collimator lens 4 to the position P11 (second position) where blue-violet laser light incident on the diffraction-grating fitted mirror 25 becomes divergent light at the time of recording or reproducing information on or from the information recording surface of the multi-layer optical disc 60 having the largest light transmitting layer thickness. Further, collimator lens actuator 14 moves the collimator lens 4 to the position P1 (third position) where red laser light incident on the flat-plate mirror 15 becomes convergent light at the time of recording or reproducing information on or from the information recording surface of the DVD 70. The position P1 (third position) is located between the position P14 (first position) and the position P11 (second position).

The collimator lens actuator 14 also moves the collimator lens 4 to the position P2 (fourth position) where red laser light incident on the flat-plate mirror 15 becomes convergent light at the time of recording or reproducing information on or from the information recording surface of the DVD 70 having the smaller light transmitting layer thickness. Further, the collimator lens actuator 14 moves the collimator lens 4 to the position P3 (fifth position) where red laser light incident on the flat-plate mirror 15 becomes convergent light at the time of recording or reproducing information on or from the information recording surface of the DVD 70 having the larger light transmitting layer thickness. The position P2 (fourth position) and the position P3 (fifth position) are located between the position P14 (first position) and the position P11 (second position).

The position P14 (first position) and the position P11 (second position) are determined by the amount of third-order spherical aberration created due to a light transmitting layer thickness error of the multi-layer optical disc 60 or an initial aberration of the objective lens 8.

Conventionally, there has been a problem peculiar to multi-layer optical discs that a movable range of a collimator lens becomes considerably large to enlarge an optical head upon recording or reproducing information on or from high-density multi-layer optical discs.

However, in the optical head of the first embodiment, the objective lens is so designed as to include the movable range of the collimator lens upon recording or reproducing information on or from DVDs in the movable range of the collimator lens upon recording or reproducing information on or from multi-layer optical discs. Thus, it is possible to suppress the enlargement of the optical head and miniaturize the optical head. Since only the range in which laser light becomes convergent light is used upon recording or reproducing information on or from DVDs, the interference of transmitting light and internally reflected light in the parallel-plate mirror for branching an optical path can be suppressed.

The movable range of the collimator lens at the time of correcting spherical aberrations in DVDs does not exceed the movable range of the collimator lens at the time of correcting spherical aberrations in multi-layer optical discs and is located close to the objective lens than the neutral position.

Figure 9A:
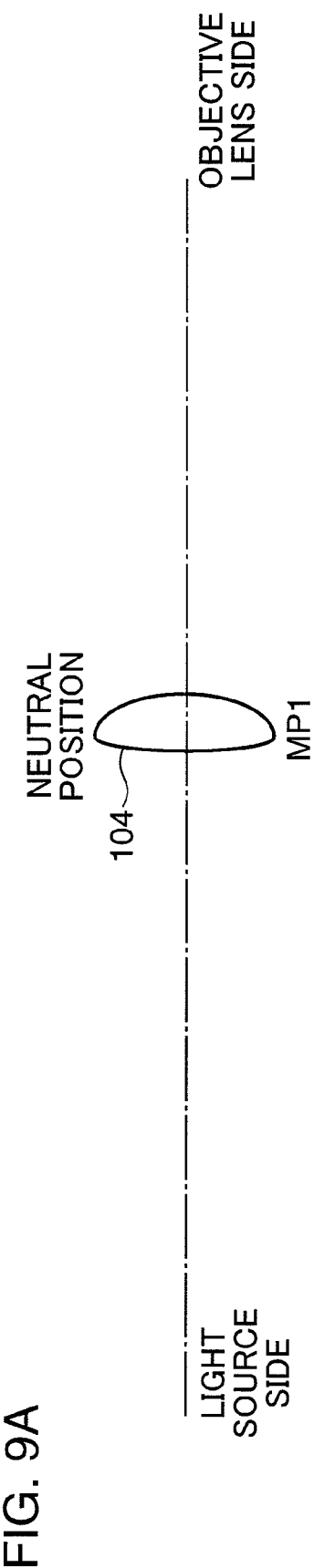
Figure 9B:
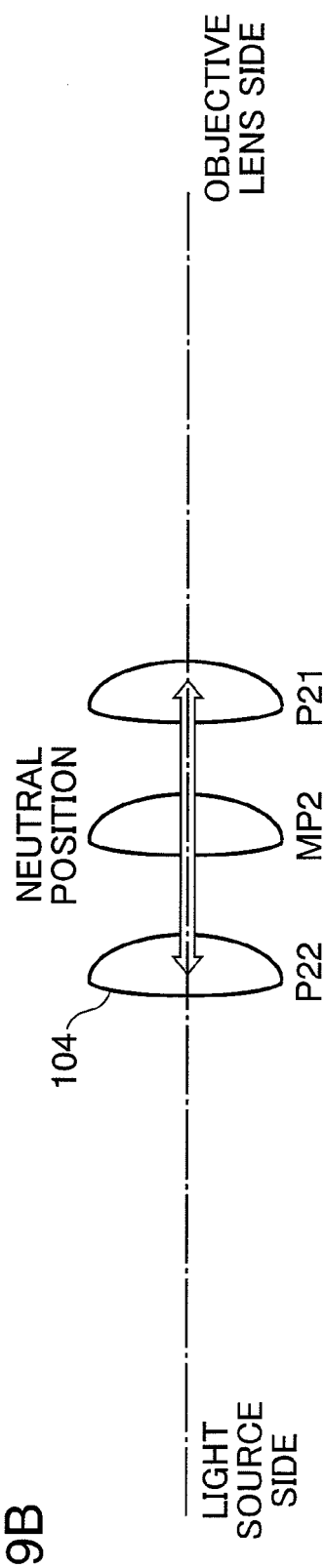
Figure 9C:
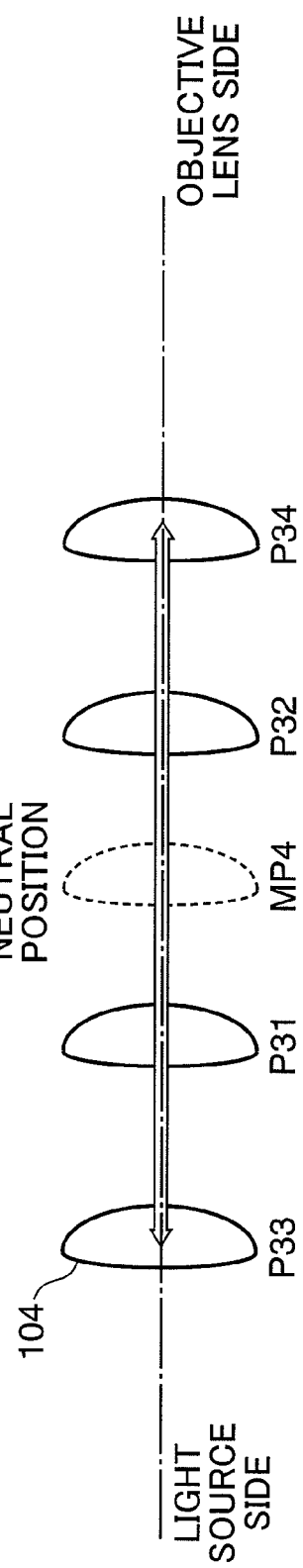

FIGS. 9A to 9C are diagrams showing comparative examples used to explain the movable range of the collimator lens 4 in the optical head 40 of the first embodiment. FIG. 9A is a diagram showing a movable range of the collimator lens 104 at the time of recording or reproducing information on or from a CD 80 in the optical head 140, FIG. 9B is a diagram showing a movable range of the collimator lens 104 at the time of recording or reproducing information on or from a DVD 70 in the optical head 140 and FIG. 9C is a diagram showing a movable range of the collimator lens 104 at the time of recording or reproducing information on or from a BD 90 in the optical head 140. In FIGS. 9A to 9C, neutral positions MP1, MP2 and MP4 differ due to differences in the wavelengths of laser light used to record or reproduce information on or from the CD 80, the DBD 70 and the BD 90.

As shown in FIG. 9A, the collimator lens actuator 114 moves the collimator lens 104 to the neutral position MP1 at the time of recording or reproducing information on or from the CD 80. Thus, substantially parallel light is incident on the compatible objective lens 118. In other words, neither divergent light nor convergent light, but substantially parallel light emerges from the collimator lens 104 at the time of recording or reproducing information on or from the CD 80.

In the case of recording or reproducing information on or from the DVD 70 in the optical head 140, the collimator lens 104 is moved to different positions depending on whether the DVD 70 is a single-layer disc or a two-layer disc. At the time of recording or reproducing information on or from the single-layer disc in the optical head 140 as shown in FIG. 9B, the collimator lens actuator 114 moves the collimator lens 104 to the neutral position MP2. Thus, substantially parallel light is incident on the compatible objective lens 118.

Further, at the time of recording or reproducing information on or from an information recording surface L0 of the two-layer disc having a smaller light transmitting layer thickness, the collimator lens actuator 114 moves the collimator lens 104 to a position P21 located closer to the objective lens than the neutral position MP2. Thus, convergent light with a specified convergence angle is incident on the compatible objective lens 118.

On the other hand, at the time of recording or reproducing information on or from an information recording surface L1 of the two-layer disc having a larger light transmitting layer thickness, the collimator lens actuator 114 moves the collimator lens 104 to a position P22 located closer to the light source than the neutral position MP2. Thus, divergent light with a specified divergence angle is incident on the compatible objective lens 118.

The BD 90 includes an information recording surface L0 having the largest light transmitting layer thickness and an information recording surface L1 having the smallest light transmitting layer thickness. As shown in FIG. 9C, at the time of recording or reproducing information on or from the information recording surface L0 of the BD 90 having the largest light transmitting layer thickness, the collimator lens actuator 114 moves the collimator lens 104 to a position P31 located closer to the light source than the neutral position MP4. Thus, divergent light with a specified divergence angle is incident on the objective lens 108.

On the other hand, at the time of recording or reproducing information on or from the information recording surface L1 of the BD 90 having the smallest light transmitting layer thickness, the collimator lens actuator 114 moves the collimator lens 104 to a position P32 located closer to the objective lens than the neutral position MP4. Thus, convergent light with a specified convergence angle is incident on the objective lens 108.

As shown in FIG. 9C, the movable range (light source side maximum position P33 to objective lens side maximum position P34) of the collimator lens 104 is so set as to be able to also correct third-order spherical aberrations created due to a thickness variation of the light transmitting layers, a temperature variation and the like.

As shown in FIGS. 9A to 9C, the movable range of the collimator lens in the optical head 140 is seen to largely differ from the movable range of the collimator lens 4 in the optical head 40 of this embodiment.

In the objective lens 108 of the optical head 140, an optimal base material thickness (designed light transmitting layer thickness) is set to 87.5 μm for the information recording surface L0 of the two-layer BD 90 having the largest light transmitting layer thickness (light transmitting layer thickness t is 100 μm) and the information recording surface L1 having the smallest light transmitting layer thickness (light transmitting layer thickness t is 75 μm). The movable range of the collimator lens 104 from the neutral position MP4 to the position P32 at the objective lens side and that from the neutral position MP4 to the position P31 at the light source side are substantially equal.

In FIG. 9C, the movable range (light source side maximum position P33 to objective lens side maximum position P34) of the collimator lens 104 is so set as to be able to also correct third-order spherical aberrations created due to the thickness variation of the light transmitting layers, the temperature variation and the like. However, no consideration is made in the optical head 140 for the multi-layer optical disc 60 having a considerably large spacing between the information recording surface having the largest light transmitting layer thickness and the one having the smallest light transmitting layer thickness. Thus, the movable range of the collimator lens 104 in the optical head 140 shown in FIG. 9C largely differs from that of the collimator lens 4 in the optical head 40 of the first embodiment shown in FIG. 8C.

Here, the objective lens 8 of the first embodiment is so designed as to have the designed light transmitting layer thickness of 80 μm. Thus, the movable range of the collimator lens 4 from the neutral position MP3 toward the objective lens side is wider than that of the collimator lens 104 moving from the neutral position MP3 toward the light source side. In other words, a range in which laser light incident on the objective lens 8 or the compatible objective lens 18 becomes convergent light is wider than the one in which laser light becomes divergent light.

The range in which laser light incident on the compatible objective lens 18 becomes convergent light is wider. Thus, even if the collimator lens 4 is moved at the time of recording or reproducing information on or from the DVD 70 as shown in FIG. 8B, the collimator lens 4 is constantly located closer to the objective lens than the neutral position MP2. This causes red laser light to be constantly incident as convergent light on the flat-plate mirror 15, wherefore the interference of the laser light in an effective area of the front monitor sensor 24 can be suppressed.

On the other hand, the range in which laser light incident on the compatible objective lens 18 becomes divergent light is narrower. However, since the collimator lens 4 is not moved at the time of recording or reproducing information on or from the CD 80 as shown in FIG. 8A, the collimator lens 4 is constantly located closer to the light source than the neutral position MP1. This causes infrared laser light to be constantly incident as divergent light on the flat-plate mirror 15, wherefore the interference of the laser light in the effective area of the front monitor sensor 24 can be suppressed.

Since the movable range of the collimator lens 4 at the time of recording or reproducing information on or from the DVD 70 lies within that of the collimator lens 4 at the time of recording or reproducing information on or from the multi-layer optical disc 60 as shown in FIG. 8B, the dimensions of the optical head 40 need not be increased.

As described above, the optical head 40 of the first embodiment can satisfactorily record or reproduce information on or from different types of optical discs, i.e. the multi-layer optical disc 60, the DVD 70 and the CD 80 using the objective lens 8 and the compatible objective lens 18.

Next, the diffraction-grating fitted mirror and the flat-plate mirror in the first embodiment are described.

The flat-plate mirror 15 substantially reflects infrared laser light and red laser light emerging from the collimator lens 4 and bends them in a direction toward the comparative objective lens 18 while almost entirely transmitting blue-violet laser light to cause it to be incident on the diffraction-grating fitted mirror 25.

A reflective coating having such a wavelength selectivity as to reflect 90% of infrared laser light and red laser light incident substantially at 45° while transmitting 10% thereof and transmit substantially 100% of blue-violet laser light is formed on a light incident surface (first surface) of the flat-plate mirror 15.

On the other hand, AR (Anti-Reflection) coating corresponding to three wavelengths of blue-violet laser light, red laser light and infrared laser light is applied to a light emergent surface (second surface) of the flat-plate mirror 15 to suppress internal reflection.

The diffraction-grating fitted mirror 25 substantially reflects blue-violet laser light emerging from the collimator lens 4 and bends most of the reflected blue-violet laser light in a direction toward the objective lens 8. The diffraction-grating fitted mirror 25 also transmits a part of blue-violet laser light and almost entire red and infrared laser light and causes the respective transmitted laser light to be incident on the front monitor sensor 24.

Figure 10:
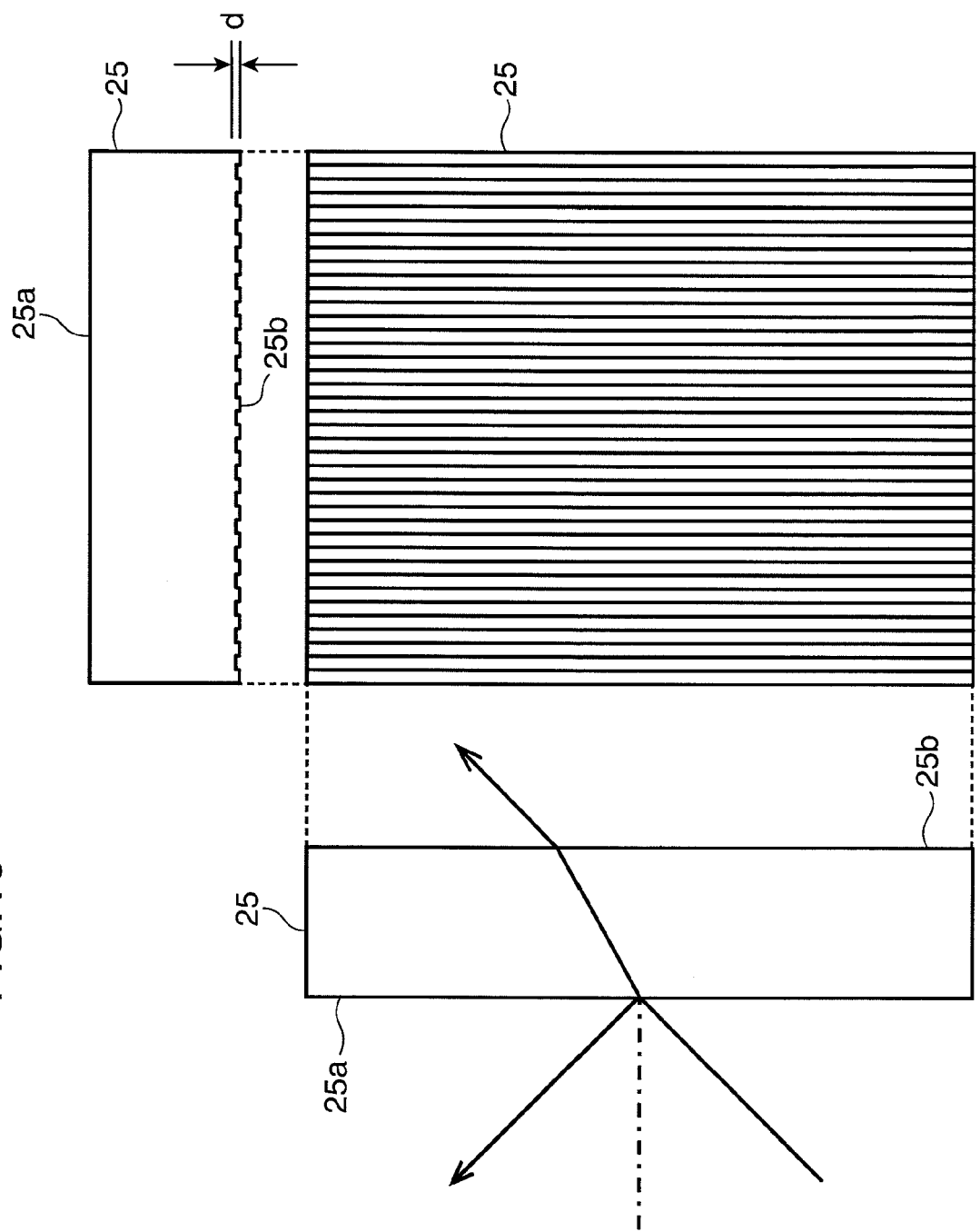
FIG. 10 is a diagram showing a schematic construction of a diffraction-grating fitted mirror according to the first embodiment of the invention.

FIG. 10 is a diagram showing a schematic construction of the diffraction-grating fitted mirror 25 in the first embodiment of the present invention. The diffraction-grating fitted mirror 25 is a flat-plate mirror. As shown in FIG. 10, a reflective coating having such a wavelength selectivity as to reflect 90% of blue-violet laser light incident substantially at 45° while transmitting 10% thereof and transmit substantially 100% of red and infrared laser light is formed on a light incident surface (first surface) 25a of the diffraction-grating fitted mirror 25.

On the other hand, a diffraction grating parallel to the incident surface on which blue-violet laser light is incident substantially at 45° is formed on a light emergent surface (second surface) 25b of the diffraction-grating fitted mirror 25. The diffraction grating has a convexo-concave pattern in which a plurality of straight lines are arranged side by side parallel to the incident surface for blue-violet laser light. The diffraction grating separates blue-violet laser light passing through the second surface 25b into $0^{th}$-order light and $\pm 1^{st}$-order diffracted light and also separates blue-violet laser light internally reflected by the second surface 25b into $0^{th}$-order light and $\pm 1^{st}$-order diffracted light. Further, AR coating corresponding to three wavelengths of blue-violet laser light, red laser light and infrared laser light is applied to the second surface 25b to suppress internal reflection. The first and second surfaces 25a, 25b are parallel to each other.

Such a diffraction-grating fitted mirror 25 can be produced by cutting a plane parallel substrate formed with the reflective coating having the above wavelength selectivity on the first surface 25a and the above diffraction grating and AR coating on the second surface 25b. Accordingly, it can be more inexpensively produced as compared with wedge-shaped reflecting mirrors, wedge-shaped beam splitters and the like.

In the diffraction-grating fitted mirror 25 of the first embodiment, depth d of the diffraction grating formed on the second surface 25b is 0.08 μm. Thus, the efficiency (reflectance) of $0^{th}$-order light of the blue-violet laser light propagating toward the front monitor sensor 24 after being internally reflected at least twice in the diffraction-grating fitted mirror 25 is substantially zero. Further, $\pm 1^{st}$-order diffracted light of the blue-violet laser light propagating toward the front monitor sensor 24 after being internally reflected at least twice in the diffraction-grating fitted mirror 25 are diffracted by the diffraction grating parallel to the incident surface for blue-violet laser light incident at 45°. Accordingly, the blue-violet laser light propagating toward the front monitor sensor 24 after being internally reflected in the diffraction-grating fitted mirror 25 is not parallel to the blue-violet laser light propagating toward the front monitor sensor 24 after passing through the diffraction-grating fitted mirror 25 even if the blue-violet laser light incident on the diffraction-grating fitted mirror 25 is parallel light.

On the other hand, the efficiency (transmittance) of $0^{th}$-order light of red laser light and infrared laser light passing through the second surface 25b is 98% or higher. Since the reflectances of the first surface 25a for the red and infrared laser light are sufficiently low, the quantities of the red and infrared laser light propagating toward the front monitor sensor 25 after being internally reflected at least twice in the diffraction-grating fitted mirror 25 are sufficiently small.

As described above, the optical head 40 of the first embodiment detects an APC signal by causing a part of incident blue-violet laser light to pass through the diffraction-grating fitted mirror 25 in the form of a flat plate and to be incident on the front monitor sensor 24. In such an optical head 40, by using the diffraction-grating fitted mirror 25, the interference of laser light in the effective area of the front monitor sensor 24 can be suppressed and APC signals accurately proportional to the quantities of light emitted from the blue-violet laser light source 1 and the two-wavelength laser light source 11 can be obtained even if laser light incident on the diffraction-grating fitted mirror 25 is parallel light.

On the other hand, the red and infrared laser light are respectively incident as convergent light and divergent light on the flat-plate mirror 15. Thus, an optical axis of laser light propagating toward the front monitor sensor 24 after passing through the flat-plate mirror 15 and the diffraction-grating fitted mirror 25 and that of laser light passing through the diffraction-grating fitted mirror 25 and propagating toward the front monitor sensor 24 after being internally reflected twice or more in the flat-plate mirror 15 are not parallel to each other. Therefore, the interference of laser light in the effective area of the front monitor sensor 24 can be suppressed and an APC signal accurately proportional to the quantity of light emitted from the two-wavelength laser light source 11 can be obtained.

Figure 11:
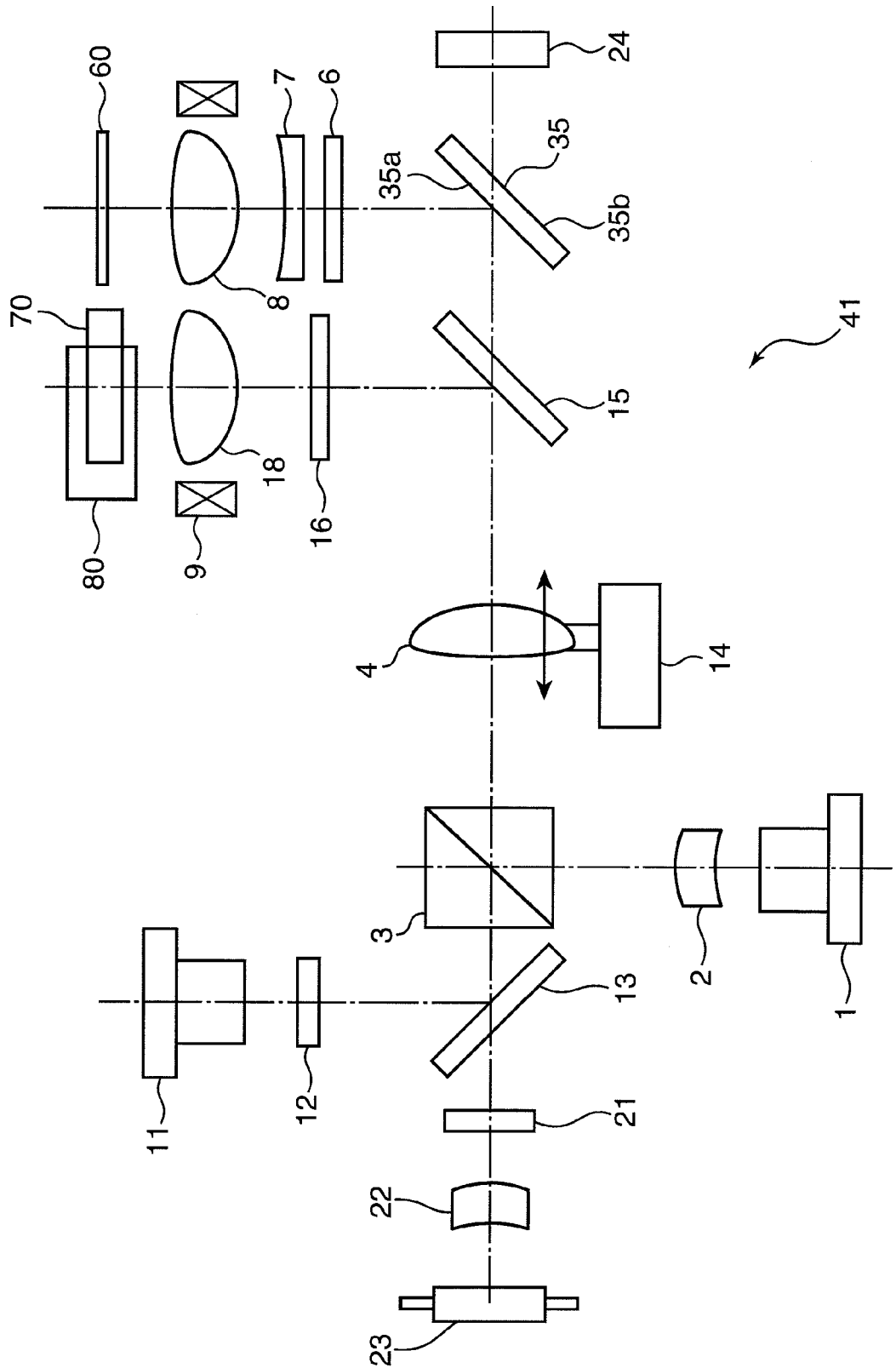
FIG. 11 is a diagram showing a schematic construction of an optical head according to a modification of the first embodiment of the invention.

The optical head of the first embodiment may include a wavelength selective mirror 35 as shown in FIG. 11 instead of the diffraction-grating fitted mirror 25.

FIG. 11 is a diagram showing a schematic construction of an optical head according to a modification of the first embodiment of the present invention. In an optical head 41 of FIG. 11, constituent elements common to the optical head 40 of FIG. 1 are identified by the same reference numerals and not described below.

The optical head 41 in FIG. 11 includes a wavelength selective mirror 35 instead of the diffraction-grating fitted mirror 25 of the optical head 40 in FIG. 1. The wavelength selective mirror 35 substantially reflects blue-violet laser light emerging from the collimator lens 4 and bends most of the reflected blue-violet laser light in a direction toward the objective lens 8. Further, the wavelength selective mirror 35 transmits a part of blue-violet laser light and almost entire red and infrared laser light and causes the respective transmitted laser light to be incident on the front monitor sensor 24.

The wavelength selective mirror 35 is a flat-plate mirror having a wavelength selectivity. A reflective coating having such a wavelength selectivity as to reflect 90% of blue-violet laser light incident substantially at 45° while transmitting 10% thereof and transmit substantially 100% of red and infrared laser light is formed on a light incident surface (first surface) 35a of the wavelength selective mirror 35.

On the other hand, AR coating optimized for the wavelength of blue-violet laser light is applied to a light emergent surface (second surface) 35b of the wavelength selective mirror 35 to suppress internal reflection of the blue-violet laser light. Since this AR coating is optimized for the wavelength of the blue-violet laser light, several % of red and infrared laser light are internally reflected. Specifically, reflectance for the wavelength of the blue-violet laser light is below 1% and reflectance for red and infrared laser light is 2% or higher. The first and second surfaces 35a, 35b are parallel to each other.

Such a wavelength selective mirror 35 can be produced by cutting a plane parallel substrate formed with the reflective coating having the above wavelength selectivity on the first surface 35a and the above AR coating on the second surface 35b. Accordingly, it can be more inexpensively produced as compared with wedge-shaped reflecting mirrors, wedge-shaped beam splitters and the like.

The reflectance of the second surface 35b of the wavelength selective mirror 35 for blue-violet laser light is below 1%. Thus, the quantity of blue-violet laser light propagating toward the front monitor sensor 24 after being internally reflected at least twice in the wavelength selective mirror 35 is sufficiently small.

On the other hand, the reflectance of the second surface 35b for red and infrared laser light is 2% or higher, but the reflectance of the first surface 35a for red and infrared laser light is sufficiently low. Thus, the quantities of red and infrared laser light propagating toward the front monitor sensor 24 after being internally reflected at least twice in the wavelength selective mirror 35 are sufficiently small.

As described above, the optical head 41 detects an APC signal by causing a part of incident blue-violet laser light to pass through the wavelength selective mirror 35 in the form of a flat plate and to be incident on the front monitor sensor 24. In such an optical head 41, by using the wavelength selective mirror 35, the interference of laser light in the effective area of the front monitor sensor 24 can be suppressed and APC signals accurately proportional to the quantities of light emitted from the blue-violet laser light source 1 and the two-wavelength laser light source 11 can be obtained even if laser light incident on the wavelength selective mirror 35 is parallel light.

Figure 12:
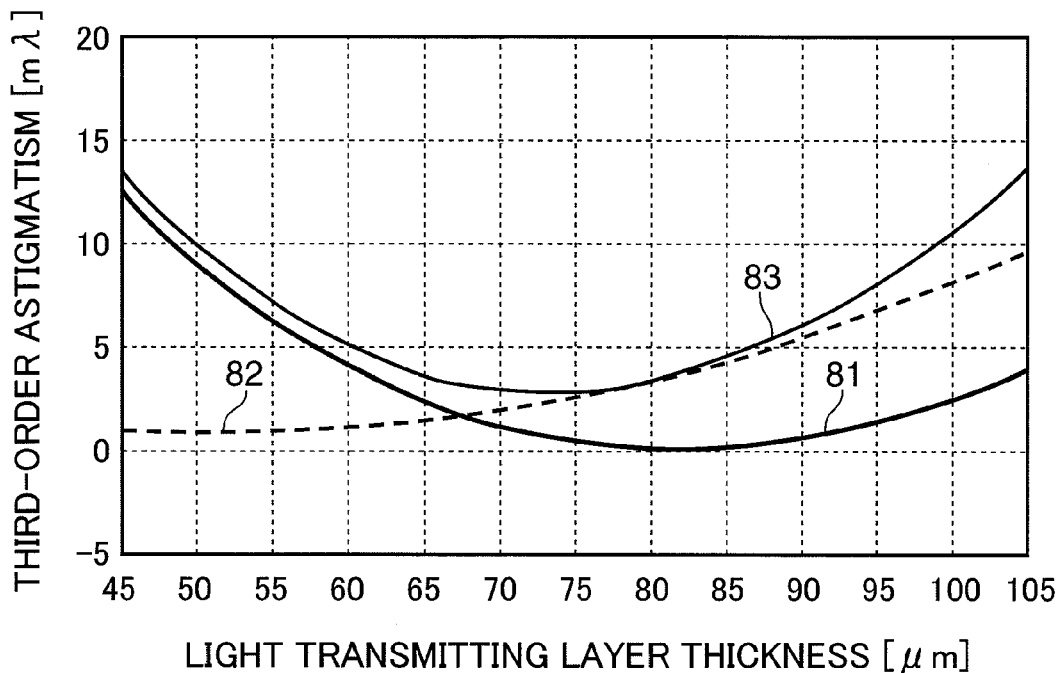
FIG. 12 is a graph chart showing a change of third-order astigmatism in relation to the light transmitting layer thickness in the case of correcting a third-order spherical aberration and in the case of correcting a third-order coma aberration.

Here, if the collimator lens 4 is moved in the optical axis direction to correct a third-order spherical aberration created according to the light transmitting layer thickness at the time of recording or reproducing information on or from the multi-layer optical disc 60, non-parallel light (divergent light or convergent light) is incident on the flat-plate mirror 15 to create a third-order astigmatism. FIG. 12 is a graph chart showing changes of third-order astigmatism in relation to the light transmitting layer thickness in the case of correcting a third-order spherical aberration and in the case of correcting a third-order coma aberration. In FIG. 12, a horizontal axis represents the light transmitting layer thickness and a vertical axis represents the amount of third-order astigmatism.

A graph 81 shown in FIG. 12 indicates a calculation result of a change in the amount of third-order astigmatism created in the case of correcting a third-order spherical aberration by moving the collimator lens 4 according to the light transmitting layer thickness. Calculation conditions for the amount of third-order astigmatism are, for example, as follows. Specifically, a designed wavelength of the objective lens 8 is 405 nm, a designed light transmitting layer thickness is 80 a numerical aperture (NA) is 0.855, and a focal length is 1.3 mm. Further, the thickness of the flat-plate mirror 15 is 1.0 mm and a refractive index thereof is 1.53.

From the graph 81 of FIG. 12, it can be understood that the amount of third-order astigmatism is minimum (=0) when the light transmitting layer thickness is the designed light transmitting layer thickness of 80 μm since parallel light is incident on the flat-plate mirror 15. The amount of third-order astigmatism increases with distance from the designed light transmitting layer thickness of 80 μm, i.e. as the non-parallelism of the blue-violet laser light incident on the flat-plate mirror 15 increases. Since the movable range of the collimator lens 4 increases in the multi-layer optical disc 60 including three or more information recording surfaces as shown in FIG. 8C, a change in the amount of third-order astigmatism created according to the light transmitting layer thickness also increases.

Here, the objective lens 8 of the first embodiment is so designed as to have the light transmitting layer thickness of 80 μm. Thus, the movable range of the collimator lens 4 moving from the neutral position MP3 toward the objective lens side is wider than that of the collimator lens 104 moving from the neutral position MP3 toward the light source side as shown in FIG. 8C. That is to say, the range in which laser light incident on the objective lens 8 becomes convergent light is wider than the one in which laser light becomes divergent light.

In other words, the objective lens 8 of the first embodiment is so designed as to satisfy the following equation (1) when it is assumed that t0 denotes the thickness of the light transmitting layer from the outer surface of the multi-layer optical disc 60 to the information recording surface L0 having the largest light transmitting layer thickness, t3 denotes the thickness of the light transmitting layer from the outer surface of the multi-layer optical disc 60 to the information recording surface L3 having the smallest light transmitting layer thickness, and tc denotes the thickness of a virtual light transmitting layer at which the absolute value of a third-order spherical aberration is minimum (i.e. the third-order spherical aberration is substantially zero) when blue-violet laser light is incident as parallel light on the objective lens 8. The light transmitting layer thickness tc indicates the designed light transmitting layer thickness of 80 μm of the objective lens 8.

$$tc > (t0+t3)/2 \quad (1)$$

Accordingly, the amount of third-order astigmatism created in the case of recording or reproducing information on or from the multi-layer optical disc 60 including four information recording surfaces L0, L1, L2 and L3 whose light transmitting layer thicknesses t0, t1, t2 and t3 are respectively 100 μm, 83 μm, 62 μm and 50 μM is larger at the side of the information recording surface L3 having the smallest light transmitting layer thickness while being smaller on the side of the information recording surface L0 having the largest light transmitting layer thickness as shown by the graph 81 of FIG. 12.

On the other hand, as described above, the amount of third-order coma aberration created when the optical disc is inclined by the specified angle (at the time of the disc tilt) increases in proportion to the light transmitting layer thickness, and the amount of third-order coma aberration created when the objective lens is inclined by the specified angle (at the time of the lens tilt) decreases with an increase in the light transmitting layer thickness. Thus, as the light transmitting layer thickness increases, a lens tilt amount for correcting a third-order coma aberration created by the disc tilt increases, which results in a larger amount of third-order astigmatism.

A graph 82 shown in FIG. 12 indicates a calculation result of a change in the amount of third-order astigmatism created in the case of correcting a third-order coma aberration by inclining the objective lens 8 when a disc tilt of 0.25° occurred. From the graph 82 of FIG. 12, it can be understood that the amount of third-order astigmatism increases as the light transmitting layer thickness increases.

Figure 22:
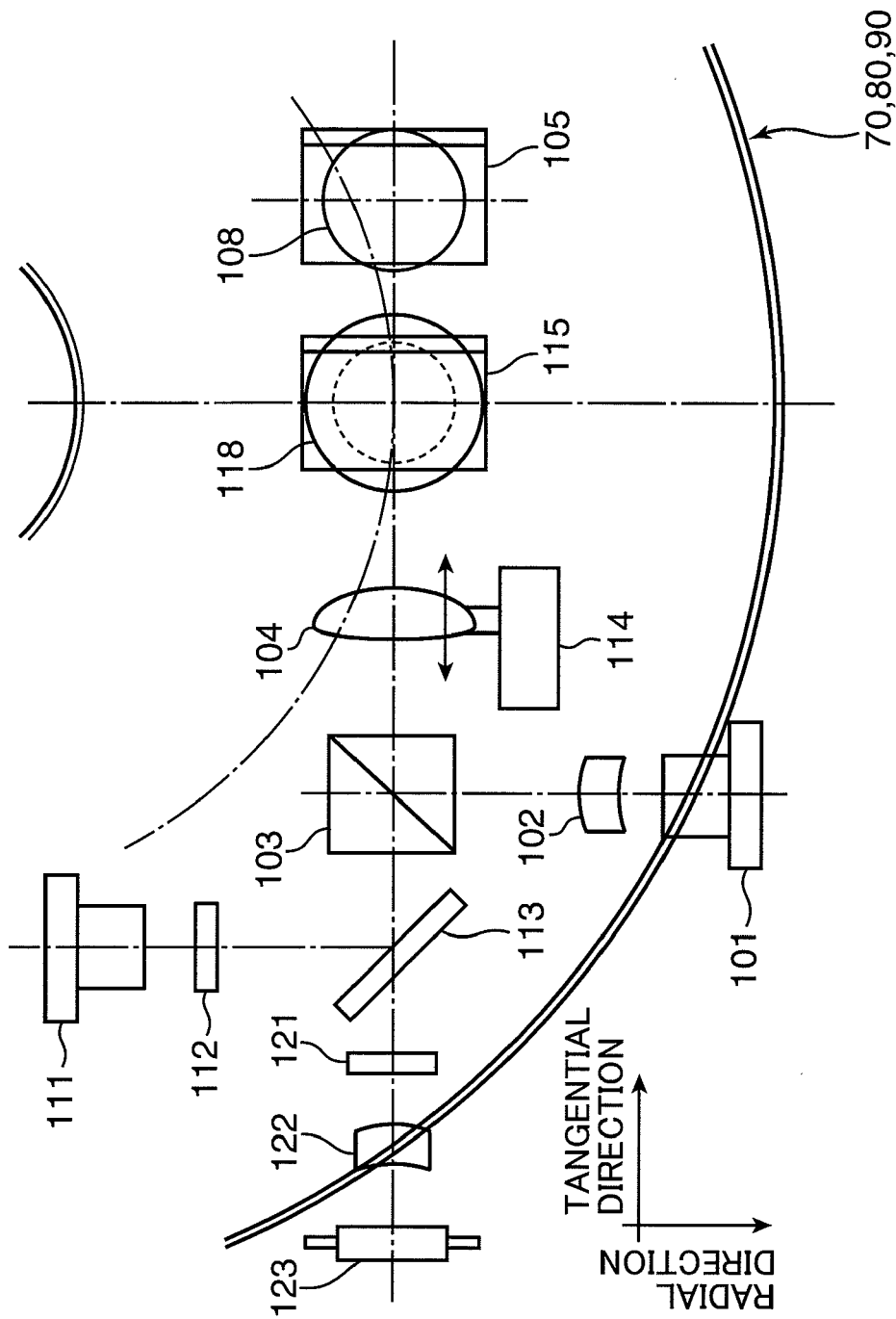
FIG. 22 is a diagram showing the arrangement of an optical head in a conventional optical disc device.
Figure 23:
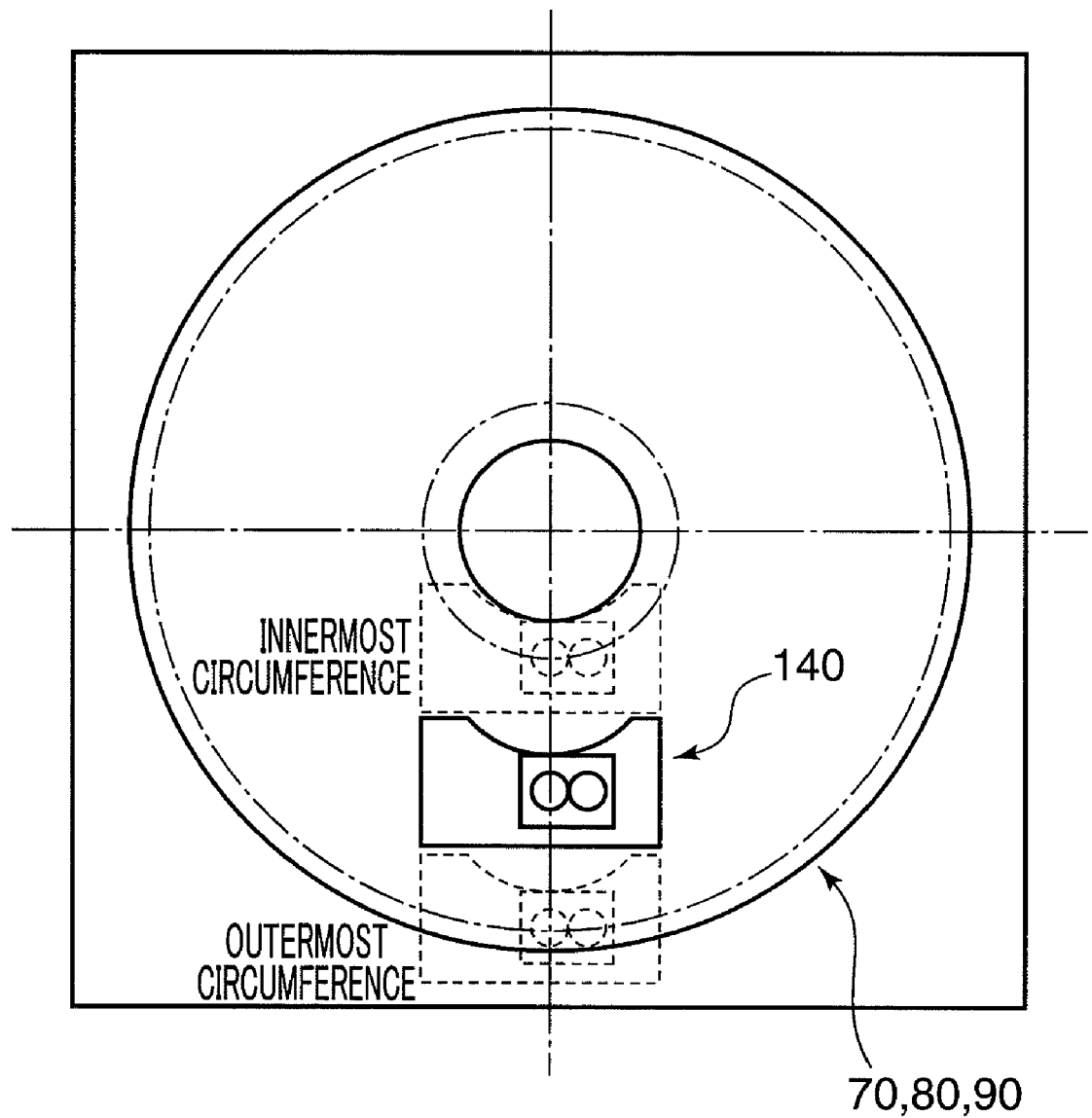
FIG. 23 is a diagram showing a state when the optical head accesses inner and outer circumferential sides of an optical disc in the conventional optical disc device.

In an optical disc device according to the first embodiment, the optical head 40 is arranged such that the optical axis of the collimator lens 4 and the tangential direction of the optical disc coincide similar to the conventional optical disc device (see FIG. 22). Accordingly, a third-order astigmatism created at the time of correcting a third-order coma aberration by inclining the objective lens 8 in the radial direction of the optical disc and a third-order astigmatism created at the time of correcting a third-order spherical aberration by moving the collimator lens 4 in the optical axis direction have the same direction component (0°/90° direction) and polarity.

The optical head 40 of the first embodiment is designed such that a third-order astigmatism created at the time of correcting a third-order spherical aberration is smaller at the side of the information recording surface L0 having the largest light transmitting layer than at the side of the information recording surface L3 having the smallest light transmitting layer thickness (graph 81 of FIG. 12). Accordingly, a third-order astigmatism (graph 83 of FIG. 12) as the sum of the third-order astigmatism (graph 81 of FIG. 12) created at the time of correcting a third-order spherical aberration and a third-order astigmatism (graph 82 of FIG. 12) created at the time of correcting a third-order coma aberration by the lens tilt is substantially equal in the information recording surface L3 having the smallest light transmitting layer thickness (light transmitting layer thickness t3=50 μm) and in the information recording surface L0 having the largest light transmitting layer thickness (light transmitting layer thickness t0=100 μm). By adopting such a construction, it can be suppressed that the third-order astigmatism increases particularly at the time of recording or reproducing information on or from an information recording surface having a larger light transmitting layer thickness.

For the objective lens of the optical head for recording or reproducing information on or from the two-layer BD, there is a small spacing between the information recording surface having the largest light transmitting layer thickness (t=100 μm) and the information recording surface having the smallest light transmitting layer thickness (t=75 μm). Thus, the movable range of the collimator lens 104 is smaller than that of the collimator lens 4 of the optical head of the first embodiment (see FIGS. 8C and 9C) and a change in the amount of third-order astigmatism created according to the light transmitting layer thickness is small.

Figure 13:
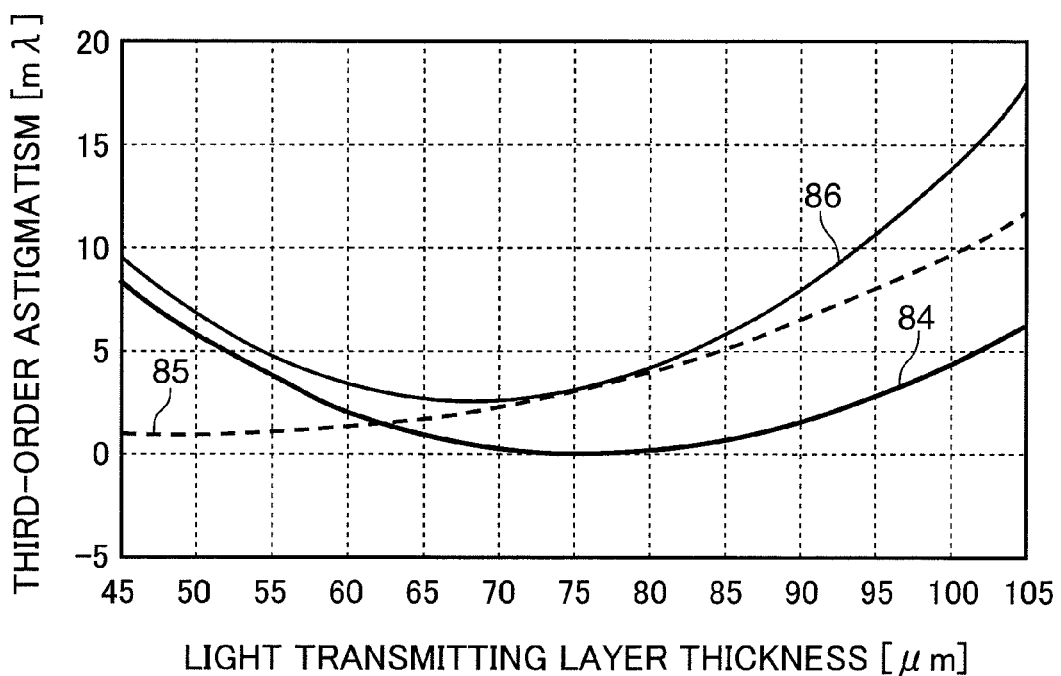
FIG. 13 is a graph chart showing a relationship between the light transmitting layer thickness and the third-order astigmatism in the case of recording or reproducing information on or from the multi-layer optical disc in a conventional optical head.

FIG. 13 is a graph chart showing a relationship between light transmitting layer thickness and third-order astigmatism in the case of recording or reproducing information on or from a multi-layer optical disc in the conventional optical head.

As described above, the objective lens of the conventional optical head is so designed as to have a characteristic such as that of the objective lens S1 shown in FIG. 5. Accordingly, the lens tilt amount for correcting a third-order coma aberration created at the time of the disc tilt can be small, wherefore a third-order astigmatism created by the lens tilt also becomes smaller.

Thus, in the objective lens of the conventional optical head, a first third-order astigmatism created at the time of correcting a third-order spherical aberration and a second third-order astigmatism created at the time of correcting a third-order coma aberration by the lens tilt are both small. Therefore, the influence of third-order astigmatisms has not been conventionally considered.

Here, it is assumed that information is recorded or reproduced on or from the multi-layer optical disc 60, in which the spacing between the information recording surface having the largest light transmitting layer thickness and the information recording surface having the smallest light transmitting layer thickness is considerably large, using the objective lens of such a conventional optical head. In this case, as shown in FIG. 13, a third-order astigmatism (graph 86 of FIG. 13) as the sum of a third-order astigmatism (graph 84 of FIG. 13) created at the time of correcting a third-order spherical aberration and a third-order astigmatism (graph 85 of FIG. 13) created at the time of correcting a third-order coma aberration by the lens tilt is unbalanced between the information recording surface L3 having the smallest light transmitting layer thickness (light transmitting layer thickness t3=50 μm) and the information recording surface L0 having the largest light transmitting layer thickness (light transmitting layer thickness t0=100 μm).

Figure 14:
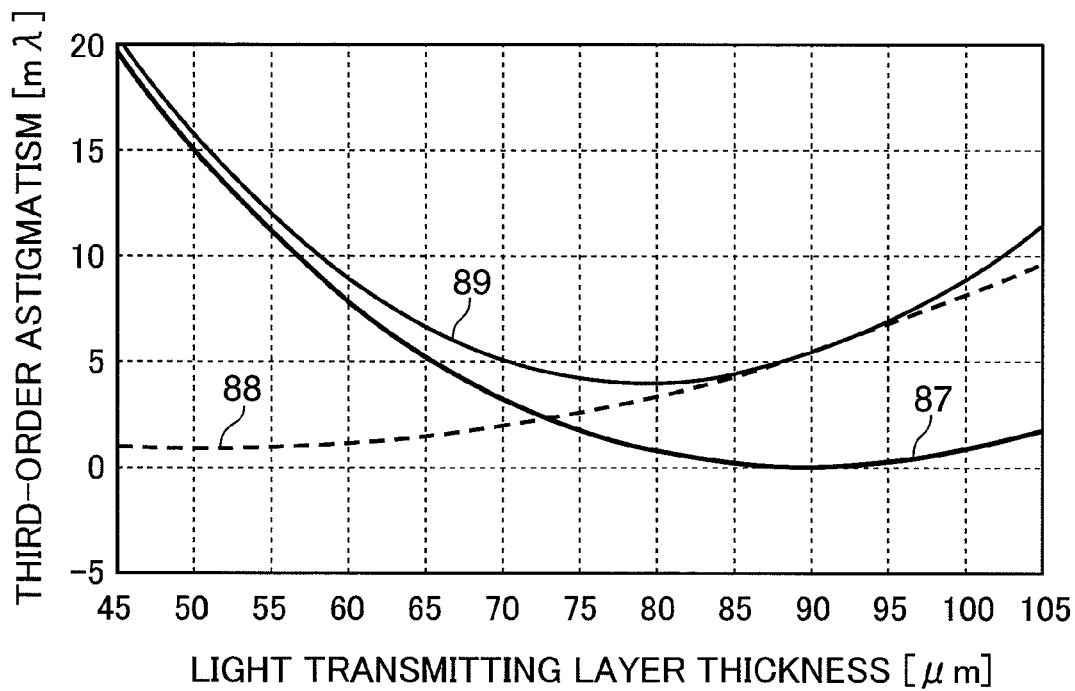
FIG. 14 is a graph chart showing a relationship between the light transmitting layer thickness and the third-order astigmatism in the case of recording or reproducing information on or from the multi-layer optical disc using an objective lens having a designed light transmitting layer thickness of 90 µm.

FIG. 14 is a graph chart showing a relationship between light transmitting layer thickness and third-order astigmatism in the case of recording or reproducing information on or from the multi-layer optical disc using an objective lens having a designed light transmitting layer thickness of 90 μm.

It is assumed that the designed light transmitting layer thickness indicating the light transmitting layer thickness at which a third-order spherical aberration is minimum when parallel light is incident is changed from 80 μm to a value close to the light transmitting layer thickness of the information recording surface L0, e.g. 90 μm. In this case, a third-order astigmatism (graph 87 of FIG. 14) created at the time of moving the collimator lens 4 according to the light transmitting layer thickness is minimum (=0) when the light transmitting layer thickness is the designed light transmitting layer thickness of 90 μm since parallel light is incident on the flat-plate mirror 15.

At this time, a third-order astigmatism (graph 89 of FIG. 14) as the sum of a third-order astigmatism (graph 87 of FIG. 14) created at the time of correcting a third-order spherical aberration and a third-order astigmatism (graph 88 of FIG. 14) created at the time of correcting a third-order coma aberration by the lens tilt becomes considerably large at the side of the information recording surface L3 having the smallest light transmitting layer thickness (light transmitting layer thickness t3=50 μm). This results from the fact that the third-order astigmatism quadratically increases as the non-parallelism of blue-violet laser light incident on the flat-plate mirror 15 increases.

As described above, it is not preferable to set the designed light transmitting layer thickness to a value close to that of the information recording surface L0. Specifically, the designed light transmitting layer thickness is preferably set to be equal to or below an average value of an intermediate value ta (ta=(t0+t3)/2) between the light transmitting layer thickness of the information recording surface L0 (t0=100 μm) and that of the information recording surface L3 (t3=50 μm) and the light transmitting layer thickness t0 of the information recording surface L0.

Accordingly, the objective lens 8 of the first embodiment is more preferably so designed as to satisfy the following equation (2) as well as the above equation (1) when it is assumed that t0 denotes the thickness of the light transmitting layer from the outer surface of the multi-layer optical disc 60 to the information recording surface L0 having the largest light transmitting layer thickness, t3 denotes the thickness of the light transmitting layer from the outer surface of the multi-layer optical disc 60 to the information recording surface L3 having the smallest light transmitting layer thickness, and tc denotes the light transmitting layer thickness at which the absolute value of a third-order spherical aberration is minimum when parallel light is incident on the objective lens 8.

$$tc \leq \{(t0+t3)/2 + t0\}/2 \quad (2)$$

In the optical head of the first embodiment, the designed light transmitting layer thickness of the objective lens 8 is 80 μm for the multi-layer optical disc 60 in which the light transmitting layer thickness t0 of the information recording surface L0 having the largest light transmitting layer thickness is 100 μm and the light transmitting layer thickness t3 of the information recording surface L3 having the smallest light transmitting layer thickness is 50 μm. By adopting such a construction, the amount of third-order astigmatism created on the information recording surface L3 having the smallest light transmitting layer thickness and the amount of third-order astigmatism created on the information recording surface L0 having the largest light transmitting layer thickness are substantially equal even if the direction component and polarity of a first third-order astigmatism created at the time of correcting a third-order spherical aberration and those of a second third-order astigmatism created at the time of correcting a third-order coma aberration by the lens tilt are equal. In this case, an increase of the third-order astigmatism can be suppressed particularly at the time of recording or reproducing information on or from the information recording surface having the larger light transmitting layer thickness.

Figure 15:
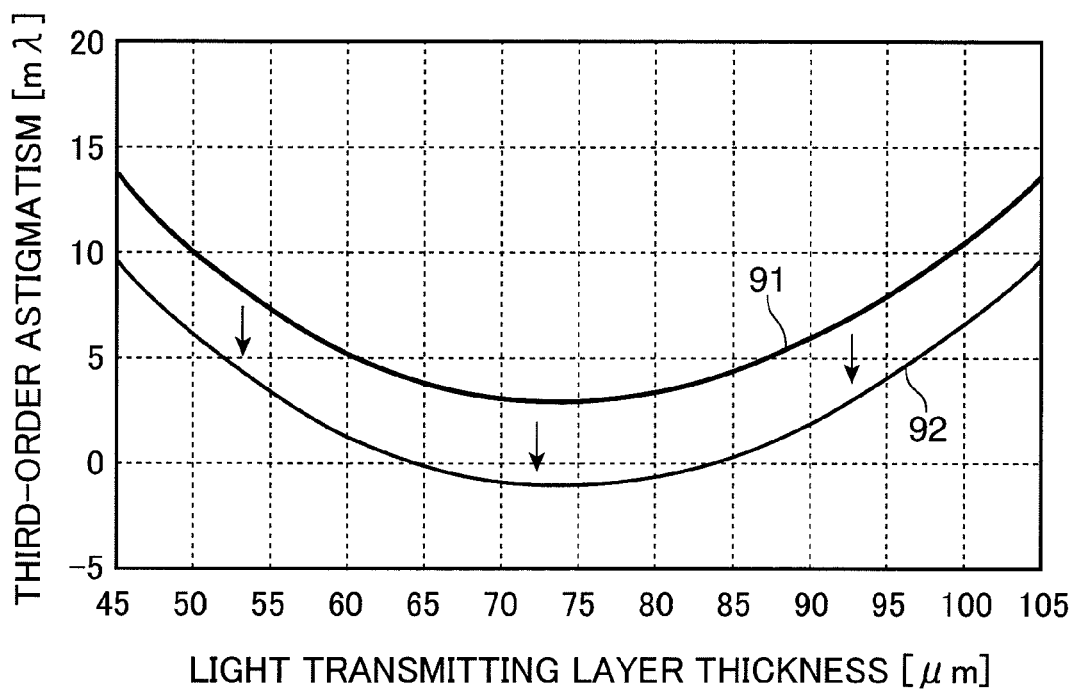
FIG. 15 is a graph chart showing a relationship between the light transmitting layer thickness and the third-order astigmatism after a correction based on an astigmatic difference of a blue-violet laser light source.

Since a general semiconductor laser has an astigmatic difference, a third-order astigmatism is also created by this astigmatic difference. FIG. 15 is a graph chart showing a relationship between light transmitting layer thickness and third-order astigmatism after the correction of the blue-violet laser light source based on an astigmatic difference. A graph 91 shown in FIG. 15 is the same as the graph 83 shown in FIG. 12.

In the optical head 40 of the first embodiment, the blue-violet laser light source 1 is arranged such that blue-violet laser light emitted from the blue-violet laser light source 1 is incident as P-polarized light on the flat-plate mirror 15, i.e. incident as S-polarized light on the polarization beam splitter 3 as shown in FIG. 1. Thus, the above third-order astigmatism (graph 81 of FIG. 12) created at the time of correcting the third-order spherical aberration and the third-order astigmatism (graph 82 of FIG. 12) created at the time of correcting the third-order coma aberration by the lens tilt invariably have the same direction component as, but an opposite polarity to a third-order astigmatism created by the astigmatic difference of the blue-violet laser light source 1.

Accordingly, a total third-order astigmatism shown by the graph 91 of FIG. 15 is offset by the third-order astigmatism created by the astigmatic difference of the blue-violet laser light source 1, wherefore the total third-order astigmatism is corrected by the astigmatic difference of the blue-violet laser light source 1 and the third-order astigmatism can be further reduced as shown by a graph 92 of FIG. 15.

If the collimator lens 4 is moved according to the light transmitting layer thickness, a fifth-order spherical aberration is created in addition to a third-order spherical aberration. Here, the fifth-order spherical aberration remaining at the time of correcting the third-order spherical aberration increases in proportion to the movement amount of the collimator lens 4. Accordingly, the objective lens 8 is preferably so designed as to minimize (≈0) the absolute value of the fifth-order spherical aberration when the light transmitting layer thickness is 75 μm between 100 μm and 50 μm. This makes a fifth-order spherical aberration remaining in the information recording surface L0 having the light transmitting layer thickness of 100 μm and a fifth-order spherical aberration remaining in the information recording surface L3 having the light transmitting layer thickness of 50 μm equal.

In other words, the objective lens 8 preferably satisfies the following equation (3) when it is assumed that t0 denotes the thickness of the light transmitting layer from the outer surface of the multi-layer optical disc 60 to the information recording surface L0 having the largest light transmitting layer thickness, t3 denotes the thickness of the light transmitting layer from the outer surface of the multi-layer optical disc 60 to the information recording surface L3 having the smallest light transmitting layer thickness, and th denotes the light transmitting layer thickness at which the absolute value of a fifth-order spherical aberration remaining at the time of correcting a third-order spherical aberration is minimum.

$$th \approx (t0+t3)/2 \quad (3)$$

From the above, the light transmitting layer thickness tc at which the absolute value of the third-order spherical aberration is minimum when parallel light is incident on the objective lens 8 and the light transmitting layer thickness th at which the absolute value of the fifth-order spherical aberration remaining at the time of correcting the third-order spherical aberration satisfy the following equation (4).

$$tc > th \quad (4)$$

By widening the range in which laser light incident on the objective lens 8 becomes convergent light and narrowing the range in which such laser light becomes divergent light as described above, the range in which laser light incident on the compatible objective lens 18 becomes convergent light is also widened. Accordingly, even if a third-order spherical aberration created according to the light transmitting layer thickness is corrected at the time of recording or reproducing information on or from the DVD 70, the objective lens 8 can be designed such that the collimator lens 4 is constantly located closer to the objective lens than the neutral position MP2 as shown in FIG. 8B.

By designing the objective lens 8 in this way, red laser light is constantly incident as convergent light on the flat-plate mirror 15, wherefore the interference of laser light in the effective area of the front monitor sensor 24 can be suppressed.

On the other hand, the collimator lens 4 need not be moved at the time of recording or reproducing information on or from the CD 80. Thus, divergent light may be caused to be incident on the compatible objective lens 18 by moving the collimator lens 4 toward the light source side relative to the neutral position MP1 or convergent light may be caused to be incident on the compatible objective lens 18 by moving the collimator lens 4 toward the objective lens side relative to the neutral position MP1.

In either case, infrared laser light is incident as divergent or convergent light on the flat-plate mirror 15, wherefore the interference of laser light in the effective area of the front monitor sensor 24 can be suppressed. The working distance of the compatible objective lens 18 can be increased by causing divergent light to be incident on the compatible objective lens 18 at the time of recording or reproducing information on or from the CD 80. Further, by causing convergent light to be incident on the compatible objective lens 18, the movement amount of the collimator lens 4 can be decreased upon switching an optical disc to have information recorded thereon or reproduced therefrom from a CD to a DVD or from a DVD to a CD. Therefore, a start time and an operating time can be shortened.

As described above, the optical head 40 of the first embodiment is so constructed as to widen the movable range of the collimator lens 4 at the side closer to the objective lens than the neutral position MP3 and narrow the movable range of the collimator lens 4 at the side closer to the light source than the neutral position MP3 at the time of recording or reproducing information on or from the multi-layer optical disc 60. Thus, it can be suppressed to increase a third-order astigmatism particularly at the time of recording or reproducing information on or from the information recording surface having the large light transmitting layer thickness and information can be satisfactorily recorded or reproduced on or from the multi-layer optical disc 60.

Although the multi-layer optical disc 60 including the four information recording surfaces L0 to L3 whose light transmitting layer thicknesses are 100 μm to 50 μm is described in the first embodiment, the structure of the multi-layer optical disc 60 is not limited to this. It goes without saying that the optical head of the first embodiment is widely applicable to multi-layer optical discs including three or more information recording surfaces.

Although the optical head for recording or reproducing information on or from three types of optical discs, i.e. the multi-layer optical disc 60, the DVD 70 and the CD 80 is described in the first embodiment, the present invention is not limited to such an optical head. It is clear that the optical head of the first embodiment can satisfactorily record or reproduce information, for example, on or from conventional single-layer and two-layer BDs in addition to the multi-layer optical disc 60, the DVD 70 and the CD 80.

Further, by using an objective lens exclusively used for DVDs as the compatible objective lens 18 for recording or reproducing information on or from the DVD 70 and the CD 80, information can be satisfactorily recorded or reproduced on or from the multi-layer optical disc 60, the BD and the DVD 70.

Although the parallel-plate mirror for transmitting and reflecting laser light at a specified ratio is a mirror for reflecting laser light emerging from the collimator lens 4 in the direction toward the optical disc in the first embodiment, the parallel-plate mirror of the present invention is not limited to the one of this embodiment.

For example, the optical head may include a parallel-plate polarization beam splitter instead of the parallel-plate mirror. In this case, laser light emitted from the laser light source is incident on the polarization beam splitter after being converted into convergent light by the collimator lens 4. The polarization beam splitter transmits or reflects a part of the laser light in the direction toward the optical disc and reflects or transmits the other part of the laser light in the direction toward the front monitor sensor 24. In this way, the output of the laser light source is controlled. Since the laser light can be incident as convergent light on the parallel-plate polarization beam splitter in this way, the interference of the laser light in the effective area of the front monitor sensor 24 can be suppressed.

As described above, even if the parallel-plate mirror for transmitting and reflecting laser light at the specified ratio is an optical path branching element for switching an optical path between the one at the laser light source side and the one at the light receiving element side such as a polarization beam splitter or a half mirror, it goes without saying that the effects of the present invention are displayed.

(Second Embodiment)

Figure 16:
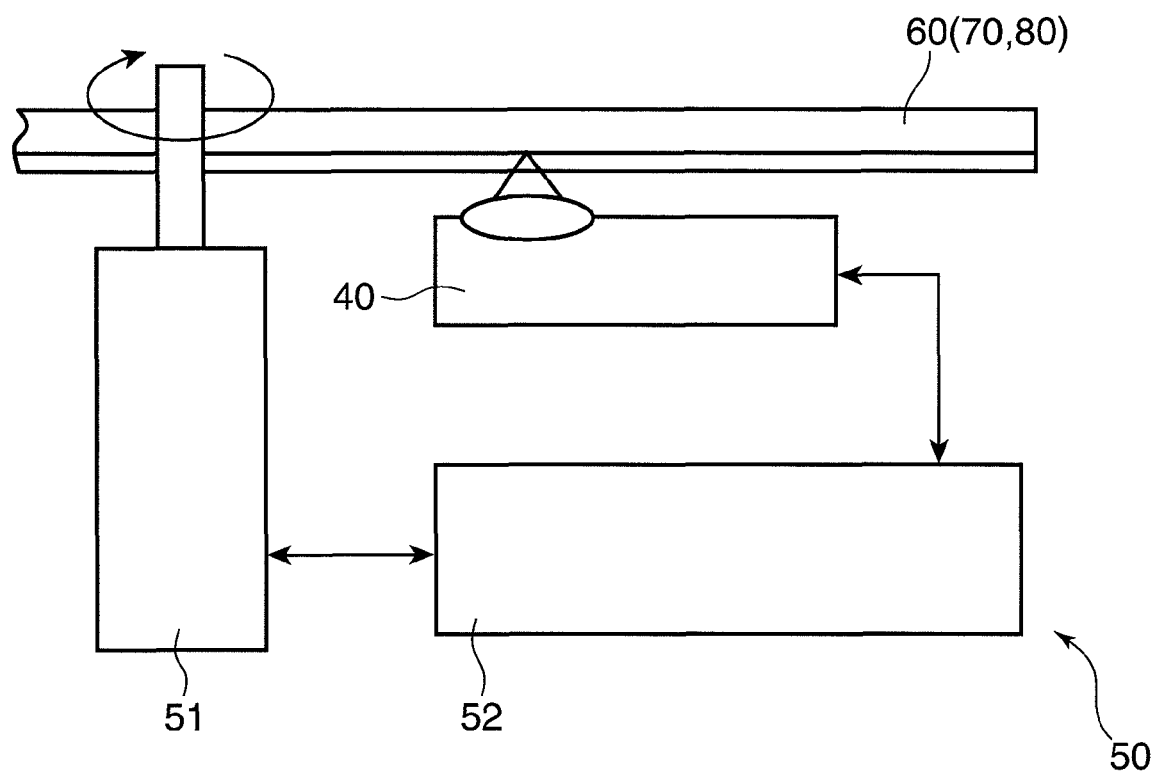
FIG. 16 is a diagram showing a schematic construction of an optical disc device according to a second embodiment of the invention.

FIG. 16 is a diagram showing a schematic construction of an optical disc device according to a second embodiment of the present invention.

In FIG. 16, an optical disc device 50 is internally provided with an optical disc driver 51, a controller 52 and an optical head 40.

The optical disc driver 51 drives and rotates a multi-layer optical disc 60 (or DVD 70 or CD 80). The optical head 40 is the one described in the first embodiment. The controller 52 controls the driving of the optical disc driver 51 and the optical head 40 and processes control signals and information signals photoelectrically converted in the optical head 40. Further, the controller 52 acts as an interface for information signals between the outside and inside of the optical disc device 50.

The controller 52 receives control signals from the optical head 40 and performs a focus control, a tracking control, an information reproduction control and a rotation control of the optical disc driver 51 in accordance with the control signals. The controller 52 also reproduces information from an information signal and sends a recording signal to the optical head 40.

Since including the optical head 40 described in the first embodiment, the optical disc device 50 of the second embodiment can satisfactorily record or reproduce information on or from a multi-layer optical disc including at least three information recording surfaces.

(Third Embodiment)

Figure 17:
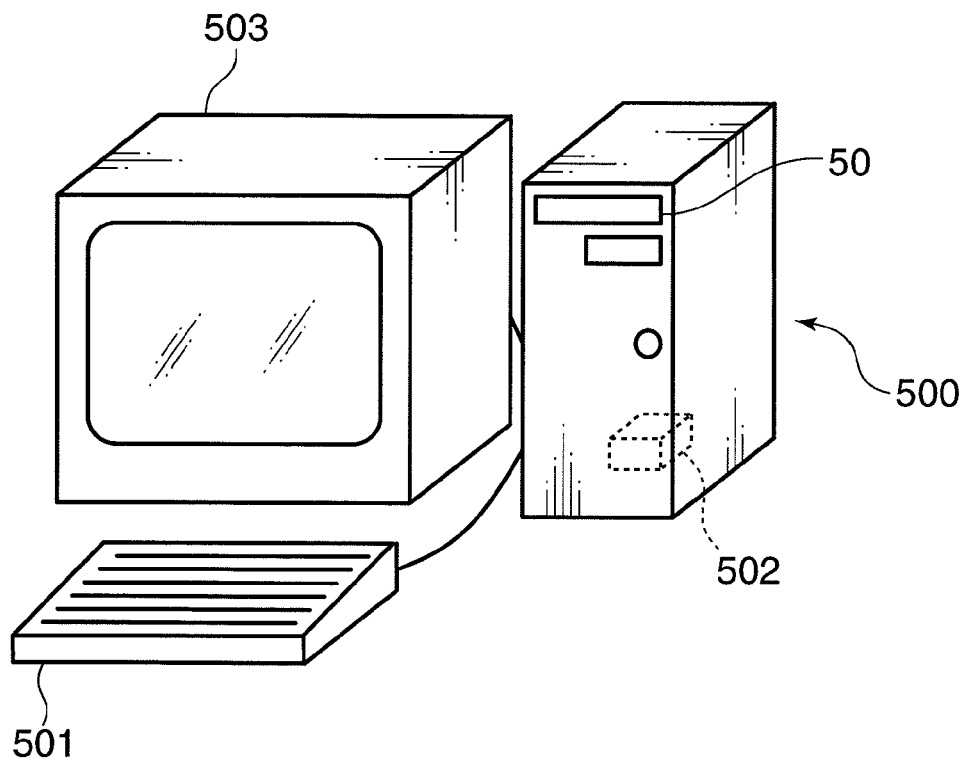
FIG. 17 is a diagram showing a schematic construction of a computer according to a third embodiment of the invention.

FIG. 17 is a diagram showing a schematic construction of a computer according to a third embodiment of the present invention.

In FIG. 17, a computer 500 is provided with the optical disc device 50 of the second embodiment, an input unit 501 such as a keyboard, a mouse or a touch panel used to input information, an arithmetic unit 502 such as a central processing unit (CPU) for calculation based on information input by the input unit 501 and information read from the optical disc device 50, and an output unit 503 such as a cathode ray tube or a liquid crystal display device for displaying information such as a calculation result by the arithmetic unit 502 or a printer for printing such information.

In the third embodiment, the computer 500 corresponds to an example of the information processing device, and the arithmetic unit 502 to an example of an information processing unit.

Since including the optical disc device 50 of the second embodiment, the computer 500 can satisfactorily record or reproduce information, particularly, on or from a multi-layer optical disc including at least three information recording surfaces and can be used for a wide range of applications.

(Fourth Embodiment)

Figure 18:
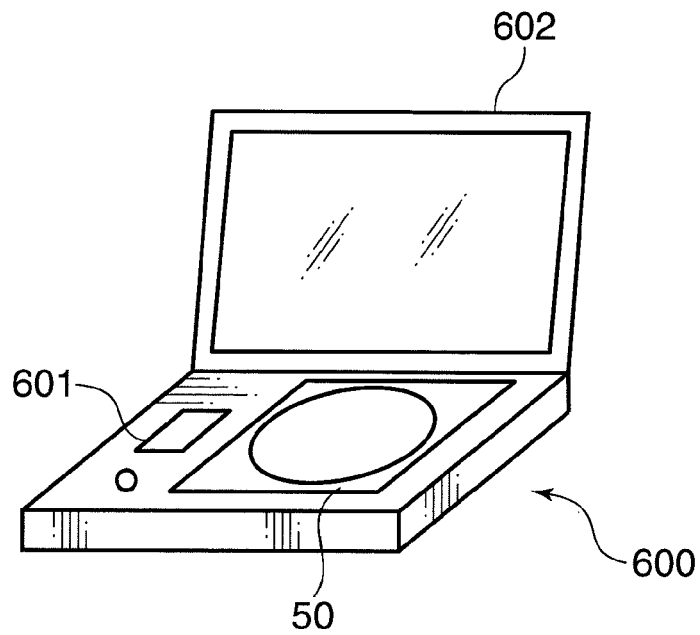
FIG. 18 is a diagram showing a schematic construction of an optical disc player according to a fourth embodiment of the invention.

FIG. 18 is a diagram showing a schematic construction of an optical disc player according to a fourth embodiment of the present invention.

In FIG. 18, an optical disc player 600 is provided with the optical disc device 50 of the second embodiment and a decoder 601 for converting an information signal obtained from the optical disc device 50 into an image signal.

The optical disc player 600 can also be used as a car navigation system by adding a position sensor such as a GPS or a central processing unit (CPU). The optical disc player 600 may also include a display unit 602 such as a liquid crystal monitor.

In the fourth embodiment, the optical disc player 600 corresponds to an example of the information processing device, and the decoder 601 to an example of the information processing unit.

Since including the optical disc device 50 of the second embodiment, the optical disc player 600 can satisfactorily record or reproduce information, particularly, on or from a multi-layer optical disc including at least three information recording surfaces and can be used for a wide range of applications.

(Fifth Embodiment)

Figure 19:
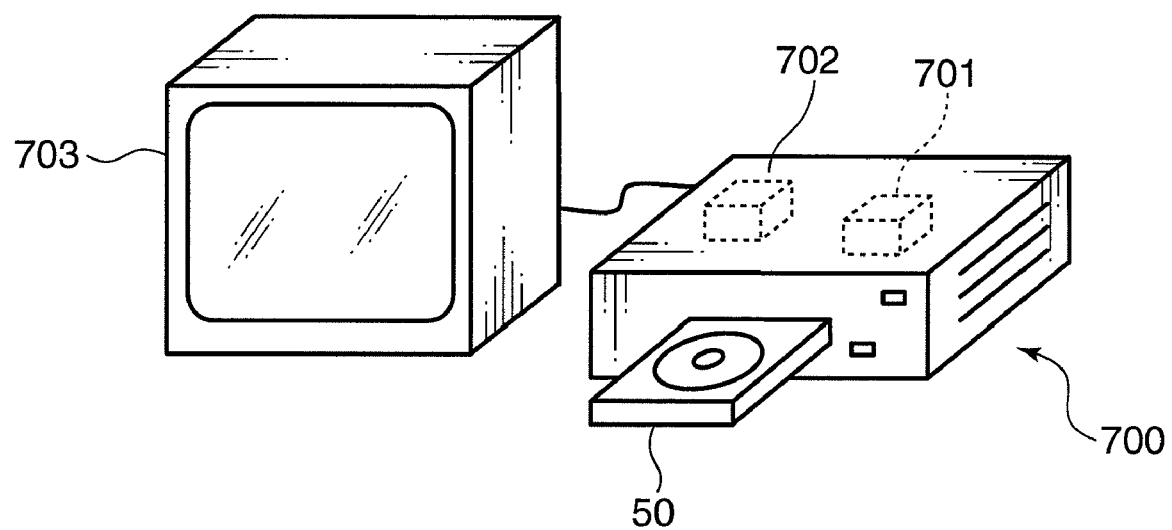
FIG. 19 is a diagram showing a schematic construction of an optical disc recorder according to a fifth embodiment of the invention.
Figure 20:
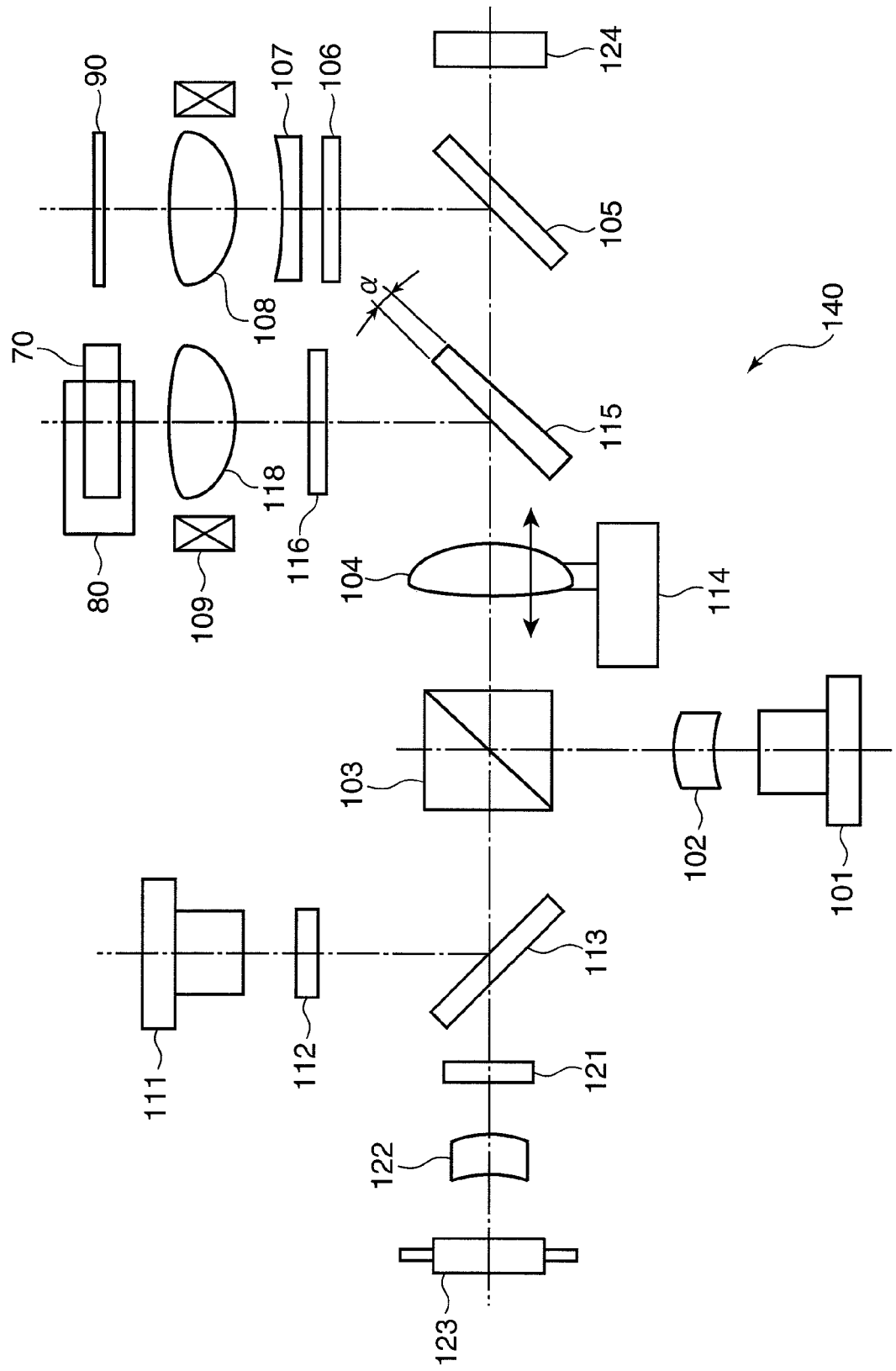
FIG. 20 is a diagram showing a schematic construction of a conventional optical head.
Figure 21:
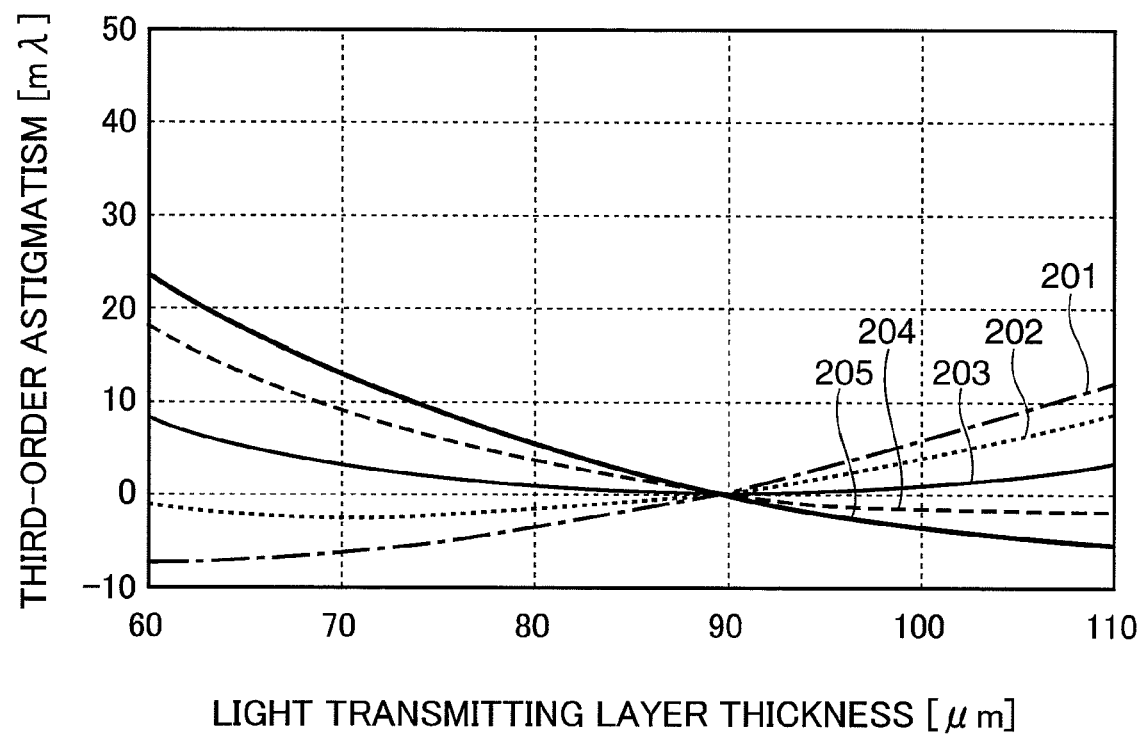
FIG. 21 is a graph chart showing a relationship between light transmitting layer thickness and third-order astigmatism for each apex α of a wedge-shaped mirror.

FIG. 19 is a diagram showing a schematic construction of an optical disc recorder according to a fifth embodiment of the present invention.

In FIG. 19, an optical disc recorder 700 is provided with the optical disc device 50 of the second embodiment and an encoder 701 for converting image information into an information signal to be recorded on an optical disc by the optical disc device 50. Preferably, the optical disc recorder 700 also includes a decoder 702 for converting an information signal obtained from the optical disc device 50 into image information, thereby being also able to reproduce a recorded image. The optical disc recorder 700 may also include an output unit 703 such as a cathode ray tube or a liquid crystal display device for displaying information or a printer for printing information.

In the fifth embodiment, the optical disc recorder 700 corresponds to an example of the information processing device, and the encoder 701 and the decoder 702 to an example of the information processing unit.

Since including the optical disc device 50 of the second embodiment, the optical disc recorder 700 can satisfactorily record or reproduce information, particularly, on or from a multi-layer optical disc including at least three information recording surfaces and can be used for a wide range of applications.

The above specific embodiments mainly embrace inventions having the following constructions.

An optical head according to one aspect of the present invention is for recording or reproducing information on or from a first information recording medium including at least three information recording surfaces having different light transmitting layer thicknesses and comprises a first light source for emitting first laser light having a first wavelength; a first mirror for reflecting and transmitting the first laser light at a specified ratio; a first objective lens for focusing the first laser light reflected by the first mirror on a specified information recording surface of the first information recording medium; a coupling lens arranged between the first light source and the first mirror; a second mirror in the form of a parallel plate arranged between the coupling lens and the first mirror; a spherical aberration corrector for correcting a third-order spherical aberration created according to the light transmitting layer thickness of the first information recording medium by moving the coupling lens in an optical axis direction; and a photodetector for receiving reflected light from the information recording surface of the first information recording medium, wherein the first objective lens is so designed as to satisfy a relationship of $tc > (t0+tn)/2$ when it is assumed that t0 denotes the thickness of a light transmitting layer from the outer surface of the first information recording medium to an information recording surface L0 having the largest light transmitting layer thickness, tn denotes the thickness of a light transmitting layer from the outer surface of the first information recording medium to an information recording surface Ln having the smallest light transmitting layer thickness and tc denotes the thickness of a virtual light transmitting layer at which the absolute value of a third-order spherical aberration is minimum when the first laser light is incident as parallel light on the first objective lens.

According to this construction, the first light source emits the first laser light having the first wavelength, and the first mirror reflects and transmits the first laser light at the specified ratio. The first objective lens focuses the first laser light reflected by the first mirror on the specified information recording surface of the first information recording medium. The coupling lens is arranged between the first light source and the first mirror, and the second mirror is a parallel-plate plate arranged between the coupling lens and the first mirror. The spherical aberration corrector corrects the third-order spherical aberration created according to the light transmitting layer thickness of the first information recording medium by moving the coupling lens in the optical axis direction. The photodetector receives the reflected light from the information recording surface of the first information recording medium. The first objective lens is so designed as to satisfy the relationship of tc>(t0+tn)/2 when it is assumed that t0 denotes the thickness of the light transmitting layer from the outer surface of the first information recording medium to the information recording surface L0 having the largest light transmitting layer thickness, tn denotes the thickness of the light transmitting layer from the outer surface of the first information recording medium to the information recording surface Ln having the smallest light transmitting layer thickness and tc denotes the thickness of the virtual light transmitting layer at which the absolute value of the third-order spherical aberration is minimum when the first laser light is incident as parallel light on the first objective lens.

In this case, a movable range of the coupling lens at a side closer to the first objective lens than a neutral position where the absolute value of the third-order spherical aberration is minimum when the first laser light is incident as parallel light on the first objective lens is wider than that of the coupling lens at a side closer to the first light source than the neutral position at the time of recording or reproducing information on or from a multi-layer optical disc. Thus, the amount of third-order astigmatism created upon recording or reproducing information on or from a multi-layer optical disc including at least three information recording surfaces can be suppressed.

In the above optical head, it is preferable that a second light source for emitting second laser light having a second wavelength longer than the first wavelength, a second objective lens for focusing the second laser light on a specified information recording surface of a second information recording medium different from the first information recording medium and a lens incliner for inclining at least the first objective lens in a radial direction of the first information recording medium are further provided; that the second mirror transmits the first laser light and reflects and transmits the second laser light at a specified ratio; the direction component and polarity of a first third-order astigmatism created upon the passage of the first laser light through the second mirror when the spherical aberration corrector moves the coupling lens in the optical axis direction are the same as those of a second third-order astigmatism created when the lens incliner inclines the first objective lens in the radial direction of the first information recording medium.

According to this construction, the second light source emits the second laser light having the second wavelength longer than the first wavelength, and the second objective lens focuses the second laser light on the specified information recording surface of the second information recording medium different from the first information recording medium. The lens incliner inclines at least the first objective lens in the radial direction of the first information recording medium. The second mirror transmits the first laser light and reflects and transmits the second laser light at the specified ratio. The direction component and polarity of the first third-order astigmatism created upon the passage of the first laser light through the second mirror when the spherical aberration corrector moves the coupling lens in the optical axis direction are the same as those of the second third-order astigmatism created when the lens incliner inclines the first objective lens in the radial direction of the first information recording medium.

In this case, since the first third-order astigmatism created at the time of correcting a third-order spherical aberration and the second third-order astigmatism created at the time of correcting a third-order coma aberration have the same direction component and polarity, a third-order astigmatism as the sum of the first and second third-order astigmatisms is a third-order astigmatism created upon recording or reproducing information on or from a multi-layer optical disc. However, since the first third-order astigmatism created at the time of correcting the third-order spherical aberration is smaller at a side of the information recording surface L0 having the large light transmitting layer thickness than at a side of the information recording surface Ln having the small light transmitting layer thickness, the third-order astigmatism as the sum of the first and second third-order astigmatisms is substantially equal in the information recording surface Ln having the smallest light transmitting layer thickness and in the information recording surface L0 having the largest light transmitting layer thickness. Therefore, the amount of third-order astigmatism created upon recording or reproducing information on or from a multi-layer optical disc including at least three information recording surfaces can be suppressed.

In the above optical head, a tangential direction of the first information recording medium orthogonal to the radial direction of the first information recording medium and an optical axis of the coupling lens are preferably substantially parallel.

In this case, since the first third-order astigmatism created at the time of correcting a third-order spherical aberration and the second third-order astigmatism created at the time of correcting a third-order coma aberration have the same direction component and polarity, a third-order astigmatism as the sum of the first and second third-order astigmatisms is a third-order astigmatism created upon recording or reproducing information on or from a multi-layer optical disc. However, since the first third-order astigmatism created at the time of correcting the third-order spherical aberration is smaller at the side of the information recording surface L0 having the large light transmitting layer thickness than at the side of the information recording surface Ln having the small light transmitting layer thickness, the third-order astigmatism as the sum of the first and second third-order astigmatisms is substantially equal in the information recording surface Ln having the smallest light transmitting layer thickness and in the information recording surface L0 having the largest light transmitting layer thickness. Therefore, the amount of third-order astigmatism created upon recording or reproducing information on or from a multi-layer optical disc including at least three information recording surfaces can be suppressed.

In the above optical head, the first light source is preferably arranged at a position where a third third-order astigmatism created by an astigmatic difference of the first light source and the first and second third-order astigmatisms cancel each other.

According to this construction, since the first light source is arranged at the position where the third third-order astigmatism created by the astigmatic difference of the first light source and the first and second third-order astigmatisms cancel each other, the third-order astigmatism as the sum of the first and second third-order astigmatisms can be further suppressed.

In the above optical head, the first light source is preferably so arranged that the first laser light emitted from the first light source is incident as P-polarized light on the second mirror. According to this construction, the first laser light emitted from the first light source can be incident as P-polarized light on the second mirror.

In the above optical head, the first objective lens preferably satisfies a relationship of $tc \leq \{(t0+tn)/2+t0\}/2$.

In the case of approximating the virtual light transmitting layer thickness tc to the light transmitting layer thickness of the information recording surface L0, a third-order astigmatism as the sum of a third-order astigmatism created at the time of correcting a third-order spherical aberration and a third-order astigmatism created at the time of correcting a third-order coma aberration by lens tilt becomes considerably large at the side of the information recording surface Ln.

However, since the first objective lens is so designed as to satisfy the relationship of tc≦{(t0+tn)/2+t0}/2, the third-order astigmatism as the sum of the third-order astigmatism created at the time of correcting the third-order spherical aberration and the third-order astigmatism created at the time of correcting the third-order coma aberration by the lens tilt can be suppressed.

In the above optical head, the first objective lens preferably satisfies a sine condition at the virtual light transmitting layer thickness tc.

According to this construction, a coma aberration can be suppressed since the first objective lens satisfies the sine condition at the virtual light transmitting layer thickness tc.

In the above optical head, the first objective lens is preferably so designed as to satisfy a relationship of th≈(t0+tn)/2 when th is assumed to be the thickness of a virtual light transmitting layer at which the absolute value of a fifth-order spherical aberration remaining at the time of correcting a third-order spherical aberration by the spherical aberration corrector is minimum.

According to this construction, a fifth-order spherical aberration remaining in the information recording surface L0 having the largest light transmitting layer thickness and a fifth-order spherical aberration remaining in the information recording surface Ln having the smallest light transmitting layer thickness are equal when the relationship of th≈(t0+tn)/2 is satisfied. Thus, the amount of fifth-order spherical aberration created upon recording or reproducing information on or from a multi-layer optical disc including at least three information recording surfaces can be suppressed.

In the above optical head, the first objective lens preferably satisfies a relationship of tc>th when th is assumed to be the thickness of a virtual light transmitting layer at which the absolute value of a fifth-order spherical aberration remaining at the time of correcting a third-order spherical aberration by the spherical aberration corrector is minimum.

According to this construction, when the relationship of tc>th is satisfied, the amounts of third-order astigmatism and fifth-order spherical aberration created upon recording or reproducing information on or from a multi-layer optical disc including at least three information recording surfaces can be suppressed.

In the above optical head, the spherical aberration corrector preferably moves the coupling lens such that the second laser light incident on the second objective lens becomes convergent light at the time of recording or reproducing information on or from the second information recording medium.

According to this construction, the coupling lens moves such that the second laser light incident on the second objective lens becomes convergent light at the time of recording or reproducing information on or from the second information recording medium. Thus, the second laser light is incident as convergent light on the second mirror, wherefore laser light passing through the second mirror and laser light emerging from the second mirror after being internally reflected in the second mirror become non-parallel and the interference of laser light in an effective area of a front photodetector for generating an auto power control signal used to control the output of the second light source can be suppressed. As a result, the laser power of laser light emitted from the light source can be accurately controlled.

In the above optical head, the spherical aberration corrector preferably corrects a spherical aberration created according to the light transmitting layer thickness of the second information recording medium by moving the coupling lens in the optical axis direction in a range in which the second laser light incident on the second objective lens becomes convergent light at the time of recording or reproducing information on or from the second information recording medium.

According to this construction, the spherical aberration created according to the light transmitting layer thickness of the second information recording medium is corrected by moving the coupling lens in the optical axis direction in the range in which the second laser light incident on the second objective lens becomes convergent light at the time of recording or reproducing information on or from the second information recording medium. Thus, the second laser light is constantly incident as convergent light on the second mirror, wherefore laser light passing through the second mirror and laser light emerging from the second mirror after being internally reflected in the second mirror become non-parallel and the interference of laser light in the effective area of the front photodetector for generating an auto power control signal used to control the output of the second light source can be suppressed. As a result, the laser power of laser light emitted from the light source can be accurately controlled.

In the above optical head, it is preferable that a third light source for emitting third laser light having a third wavelength longer than the second wavelength is further provided; that the second mirror reflects and transmits the third laser light at a specified ratio; that the second objective lens focuses the third laser light reflected by the second mirror on a specified information recording surface of a third information recording medium different from the first and second information recording media; and that the spherical aberration corrector moves the coupling lens such that the third laser light incident on the second objective lens becomes convergent light at the time of recording or reproducing information on or from the third information recording medium.

According to this construction, the third light source emits the third laser light having the third wavelength longer than the second wavelength, the second mirror reflects and transmits the third laser light at the specified ratio, and the second objective lens focuses the third laser light reflected by the second mirror on the specified information recording surface of the third information recording medium different from the first and second information recording media. Then, the spherical aberration corrector moves the coupling lens such that the third laser light incident on the second objective lens becomes convergent light at the time of recording or reproducing information on or from the third information recording medium.

Thus, the third laser light is incident as convergent light on the second mirror, wherefore laser light passing through the second mirror and laser light emerging from the second mirror after being internally reflected in the second mirror become non-parallel and the interference of laser light in the effective area of the front photodetector for generating an auto power control signal used to control the output of the third light source can be suppressed. As a result, the laser power of laser light emitted from the light source can be accurately controlled.

In the above optical head, it is preferable that a third light source for emitting third laser light having a third wavelength longer than the second wavelength is further provided; that the second mirror reflects and transmits the third laser light at a specified ratio; that the second objective lens focuses the third laser light reflected by the second mirror on a specified information recording surface of a third information recording medium different from the first and second information recording media; and that the spherical aberration corrector moves the coupling lens such that the third laser light incident on the second objective lens becomes divergent light at the time of recording or reproducing information on or from the third information recording medium.

According to this construction, the third light source emits the third laser light having the third wavelength longer than the second wavelength, the second mirror reflects and transmits the third laser light at the specified ratio, and the second objective lens focuses the third laser light reflected by the second mirror on the specified information recording surface of the third information recording medium different from the first and second information recording media. Then, the spherical aberration corrector moves the coupling lens such that the third laser light incident on the second objective lens becomes divergent light at the time of recording or reproducing information on or from the third information recording medium.

Thus, the third laser light is incident as divergent light on the second mirror, wherefore laser light passing through the second mirror and laser light emerging from the second mirror after being internally reflected in the second mirror become non-parallel and the interference of laser light in the effective area of the front photodetector for generating an auto power control signal used to control the output of the third light source can be suppressed. As a result, the laser power of laser light emitted from the light source can be accurately controlled.

In the above optical head, it is preferable that a second light source for emitting second laser light having a second wavelength longer than the first wavelength and a second objective lens for focusing the second laser light on a specified information recording surface of a second information recording medium different from the first information recording medium are further provided; that the first mirror is a parallel-plate mirror and transmits and reflects the first laser light at a specified ratio; that the second mirror transmits and reflects the second laser light at a specified ratio; the coupling lens is arranged between the first light source and the first mirror and between the second light source and the second mirror; that the spherical aberration corrector moves the coupling lens to a first position where the first laser light incident on the first mirror becomes convergent light at the time of recording or reproducing information on or from the information recording surface of the first information recording medium having the smallest light transmitting layer thickness, moves the coupling lens to a second position where the first laser light incident on the first mirror becomes divergent light at the time of recording or reproducing information on or from the information recording surface of the first information recording medium having the largest light transmitting layer thickness and moves the coupling lens to a third position where the second laser light incident on the second mirror becomes convergent light at the time of recording or reproducing information on or from the information recording surface of the second information recording medium; and that the third position is located between the first and second positions.

According to this construction, the spherical aberration corrector moves the coupling lens to the first position where the first laser light incident on the first mirror becomes convergent light at the time of recording or reproducing information on or from the information recording surface of the first information recording medium having the smallest light transmitting layer thickness. Further, the spherical aberration corrector moves the coupling lens to the second position where the first laser light incident on the first mirror becomes divergent light at the time of recording or reproducing information on or from the information recording surface of the first information recording medium having the largest light transmitting layer thickness. Furthermore, the spherical aberration corrector moves the coupling lens to the third position where the second laser light incident on the second mirror becomes convergent light at the time of recording or reproducing information on or from the information recording surface of the second information recording medium. The third position is located between the first and second positions.

Thus, the first laser light is incident as convergent or divergent light on the first mirror and the second laser light is incident as convergent light on the second mirror, wherefore laser light passing through the first mirror or the second mirror and laser light emerging from the first or second mirror after being internally reflected in the first or second mirror become non-parallel and the interference of laser light in the effective area of the front photodetector for generating an auto power control signal used to control the output of the first or second light source can be suppressed. As a result, the laser power of laser light emitted from the light source can be accurately controlled.

Further, since the third position is located between the first and second positions, the enlargement of the optical head can be suppressed.

In the above optical head, it is preferable that a second light source for emitting second laser light having a second wavelength longer than the first wavelength and a second objective lens for focusing the second laser light on a specified information recording surface of a second information recording medium different from the first information recording medium and including a plurality of information recording surfaces having different light transmitting layer thicknesses are further provided; that the first mirror is a parallel-plate mirror and transmits and reflects the first laser light at a specified ratio; that the second mirror transmits and reflects the second laser light at a specified ratio; that the coupling lens is arranged between the first light source and the first mirror and between the second light source and the second mirror; that the spherical aberration corrector moves the coupling lens to a first position where the first laser light incident on the first mirror becomes convergent light at the time of recording or reproducing information on or from the information recording surface of the first information recording medium having the smallest light transmitting layer thickness, moves the coupling lens to a second position where the first laser light incident on the first mirror becomes divergent light at the time of recording or reproducing information on or from the information recording surface of the first information recording medium having the largest light transmitting layer thickness, moves the coupling lens to a fourth position where the second laser light incident on the second mirror becomes convergent light at the time of recording or reproducing information on or from the information recording surface of the second information recording medium having the smallest light transmitting layer thickness and moves the coupling lens to a fifth position where the second laser light incident on the second mirror becomes convergent light at the time of recording or reproducing information on or from the information recording surface of the second information recording medium having the largest light transmitting layer thickness; and that the fourth and fifth positions are located between the first and second positions.

According to this construction, the spherical aberration corrector moves the coupling lens to the first position where the first laser light incident on the first mirror becomes convergent light at the time of recording or reproducing information on or from the information recording surface of the first information recording medium having the smallest light transmitting layer thickness. The spherical aberration corrector also moves the coupling lens to the second position where the first laser light incident on the first mirror becomes divergent light at the time of recording or reproducing information on or from the information recording surface of the first information recording medium having the largest light transmitting layer thickness. Further, the spherical aberration corrector moves the coupling lens to the fourth position where the second laser light incident on the second mirror becomes convergent light at the time of recording or reproducing information on or from the information recording surface of the second information recording medium having the smallest light transmitting layer thickness. Furthermore, the spherical aberration corrector moves the coupling lens to the fifth position where the second laser light incident on the second mirror becomes convergent light at the time of recording or reproducing information on or from the information recording surface of the second information recording medium having the largest light transmitting layer thickness. The fourth and fifth positions are located between the first and second positions.

Thus, the first laser light is incident as convergent or divergent light on the first mirror and the second laser light is constantly incident as convergent light on the second mirror, wherefore laser light passing through the first or second mirror and laser light emerging from the first or second mirror after being internally reflected in the first or second mirror become non-parallel and the interference of laser light in the effective area of the front photodetector for generating an auto power control signal used to control the output of the first or second light source can be suppressed. As a result, the laser power of laser light emitted from the light source can be accurately controlled.

Further, since the fourth and fifth positions are located between the first and second positions, the enlargement of the optical head can be suppressed.

In the above optical head, the first and second positions are preferably determined by a correction amount of a third-order spherical aberration created due to an error in the light transmitting layer thickness of the first information recording medium or an initial aberration of the first objective lens.

According to this construction, since the first and second positions are determined by the correction amount of the third-order spherical aberration created by the error in the light transmitting layer thickness of the first information recording medium or the initial aberration of the first objective lens, a movable range of the coupling lens can be suitably set.

In the above optical head, it is preferable to further comprise a front photodetector for receiving the second laser light having passed through the second mirror and generating an auto power control signal used to control the output of the second light source based on the received second laser light.

According to this construction, the interference of laser light in an effective area of the front photodetector for generating the auto power control signal used to control the output of the second light source can be suppressed.

An optical head according to another aspect of the present invention comprises a first light source for emitting first laser light having a first wavelength; a second light source for emitting second laser light having a second wavelength longer than the first wavelength; a first parallel-plate mirror for reflecting and transmitting the first laser light at a specified ratio; a second parallel-plate mirror for reflecting and transmitting the second laser light at a specified ratio; a first objective lens for focusing the first laser light on a specified information recording surface of a first information recording medium including a plurality of information recording surfaces having different light transmitting layer thicknesses; a second objective lens for focusing the second laser light on an information recording surface of the second information recording medium different from the first information recording medium; a coupling lens arranged between the first light source and the first parallel-plate mirror and between the second light source and the second parallel-plate mirror; and a lens driver for moving the coupling lens in an optical axis direction; wherein the lens driver moves the coupling lens to a first position where the first laser light incident on the first parallel-plate mirror becomes convergent light at the time of recording or reproducing information on or from the information recording surface of the first information recording medium having the smallest light transmitting layer thickness, moves the coupling lens to a second position where the first laser light incident on the first parallel-plate mirror becomes divergent light at the time of recording or reproducing information on or from the information recording surface of the first information recording medium having the largest light transmitting layer thickness and moves the coupling lens to a third position where the second laser light incident on the second parallel-plate mirror becomes convergent light at the time of recording or reproducing information on or from the second information recording medium; and that the third position is located between the first and second positions.

According to this construction, the lens driver moves the coupling lens to the first position where the first laser light incident on the first parallel-plate mirror becomes convergent light at the time of recording or reproducing information on or from the information recording surface of the first information recording medium having the smallest light transmitting layer thickness. Further, the lens driver moves the coupling lens to the second position where the first laser light incident on the first parallel-plate mirror becomes divergent light at the time of recording or reproducing information on or from the information recording surface of the first information recording medium having the largest light transmitting layer thickness. Furthermore, the lens driver moves the coupling lens to the third position where the second laser light incident on the second parallel-plate mirror becomes convergent light at the time of recording or reproducing information on or from the second information recording medium. The third position is located between the first and second positions.

Thus, the first laser light is incident as convergent or divergent light on the first parallel-plate mirror and the second laser light is incident as convergent light on the second parallel-plate mirror, wherefore laser light passing through the first or second parallel-plate mirror and laser light emerging from the first or second parallel-plate mirror after being internally reflected in the first or second parallel-plate mirror become non-parallel and the interference of laser light in the effective area of the front photodetector for generating an auto power control signal used to control the output of the first or second light source can be suppressed. As a result, the laser power of laser light emitted from the light source can be accurately controlled.

An optical disc device according to still another aspect of the present invention comprises any one of the above optical heads; a motor for driving and rotating an information recording medium; and a controller for controlling the optical head and the motor. According to this construction, the above optical head can be applied to an optical disc device.

An information processing device according to further another aspect of the present invention comprises the above optical disc device; and an information processing unit for processing information to be recorded by the optical disc device and/or information reproduced from the optical disc device. According to this construction, an optical disc device including the above optical head can be applied to an information processing device.

The optical head, the optical disc device and the information processing device according to the present invention can satisfactorily record or reproduce information on or from a multi-layer optical disc including at least three information recording surfaces by inexpensive constructions and are useful as an optical head, an optical disc device and an information processing device for recording or reproducing information on or from a plurality of types of information recording media having different light transmitting layer thicknesses.

This application is based on U.S. Provisional Patent Application No. 61/108,245 filed on Oct. 24, 2008 and Japanese Patent Application No. 2008-332575 filed on Dec. 26, 2008, the contents of which are hereby incorporated by reference.

The specific embodiments or examples in the detailed description of the invention are merely to illustrate the technical contents of the present invention and the present invention should not be narrowly interpreted by being limited to such specific examples and various changes can be made within the spirit of the present invention and the scope as claimed.

What is claimed is:

1. An optical head for recording or reproducing information on or from a first information recording medium including at least three information recording surfaces having different light transmitting layer thicknesses, comprising:
   a first light source for emitting first laser light having a first wavelength;
   a first mirror for reflecting the first laser light;
   a first objective lens for focusing the first laser light reflected by the first mirror on a specified information recording surface of the first information recording medium;
   a coupling lens arranged between the first light source and the first mirror;
   a second mirror in the form of a parallel plate arranged between the coupling lens and the first mirror;
   a spherical aberration corrector for correcting a third-order spherical aberration created according to the light transmitting layer thickness of the first information recording medium by moving the coupling lens in an optical axis direction; and
   a photodetector for receiving reflected light from the information recording surface of the first information recording medium;
   wherein the first objective lens is so designed as to be tilted in a radial direction of the first information recording medium, and satisfy a relationship of tc>(t0+tn)/2 when it is assumed that t0 denotes the thickness of a light transmitting layer from the outer surface of the first information recording medium to an information recording surface L0 having the largest light transmitting layer thickness, tn denotes the thickness of a light transmitting layer from the outer surface of the first information recording medium to an information recording surface Ln having the smallest light transmitting layer thickness and tc denotes the thickness of a virtual light transmitting layer at which the absolute value of a third-order spherical aberration is minimum when the first laser light is incident as parallel light on the first objective lens.

2. An optical head according to claim 1, further comprising:
   a second light source for emitting second laser light having a second wavelength longer than the first wavelength;
   a second objective lens for focusing the second laser light on a specified information recording surface of a second information recording medium different from the first information recording medium; and
   a lens incliner for inclining at least the first objective lens in a radial direction of the first information recording medium,
   wherein:
   the second mirror transmits the first laser light and reflects and transmits the second laser light at a specified ratio, and
   the direction component and polarity of a first third-order astigmatism created upon the passage of the first laser light through the second mirror when the spherical aberration corrector moves the coupling lens in the optical axis direction are the same as those of a second third-order astigmatism created when the lens incliner inclines the first objective lens in the radial direction of the first information recording medium.

3. An optical head according to claim 1, wherein a tangential direction of the first information recording medium orthogonal to the radial direction of the first information recording medium and an optical axis of the coupling lens are substantially parallel.

4. An optical head according to claim 2, wherein the first light source is arranged at a position where a third third-order astigmatism created by an astigmatic difference of the first light source and the first and second third-order astigmatisms cancel each other.

5. An optical head according to claim 2, wherein the first light source is so arranged that the first laser light emitted from the first light source is incident as P-polarized light on the second mirror.

6. An optical head according to claim 2, wherein the spherical aberration corrector moves the coupling lens such that the second laser light incident on the second objective lens becomes convergent light at the time of recording or reproducing information on or from the second information recording medium.

7. An optical head according to claim 6, wherein the spherical aberration corrector corrects a spherical aberration created according to the light transmitting layer thickness of the second information recording medium by moving the coupling lens in the optical axis direction in a range in which the second laser light incident on the second objective lens becomes convergent light at the time of recording or reproducing information on or from the second information recording medium.

8. An optical head according to claim 6, further comprising a third light source for emitting third laser light having a third wavelength longer than the second wavelength, wherein:
   the second mirror reflects and transmits the third laser light at a specified ratio,
   the second objective lens focuses the third laser light reflected by the second mirror on a specified information recording surface of a third information recording medium different from the first and second information recording media, and
   the spherical aberration corrector moves the coupling lens such that the third laser light incident on the second objective lens becomes convergent light at the time of recording or reproducing information on or from the third information recording medium.

9. An optical head according to claim 6, further comprising a third light source for emitting third laser light having a third wavelength longer than the second wavelength, wherein:
   the second mirror reflects and transmits the third laser light at a specified ratio, the second objective lens focuses the third laser light reflected by the second mirror on a specified information recording surface of a third information recording medium different from the first and second information recording media, and the spherical aberration corrector moves the coupling lens such that the third laser light incident on the second objective lens becomes divergent light at the time of recording or reproducing information on or from the third information recording medium.

10. An optical head according to claim 1, wherein the first objective lens further satisfies a relationship of tc≦{(t0+tn)/2+t0}/2.

11. An optical head according to claim 1, wherein the first objective lens satisfies a sine condition at the virtual light transmitting layer thickness tc.

12. An optical head according to claim 1, wherein the first objective lens is so designed as to satisfy a relationship of th≈(t0+tn)/2 when th is assumed to be the thickness of a virtual light transmitting layer at which the absolute value of a fifth-order spherical aberration remaining at the time of correcting a third-order spherical aberration by the spherical aberration corrector is minimum.

13. An optical head according to claim 1, wherein the first objective lens satisfies a relationship of tc>th when th is assumed to be the thickness of a virtual light transmitting layer at which the absolute value of a fifth-order spherical aberration remaining at the time of correcting a third-order spherical aberration by the spherical aberration corrector is minimum.

14. An optical head according to claim 1, further comprising:
a second light source for emitting second laser light having a second wavelength longer than the first wavelength; and
a second objective lens for focusing the second laser light on a specified information recording surface of a second information recording medium different from the first information recording medium,
wherein:
the first mirror is a parallel-plate mirror and transmits and reflects the first laser light at a specified ratio,
the second mirror transmits and reflects the second laser light at a specified ratio,
the coupling lens is arranged between the first light source and the first mirror and between the second light source and the second mirror,
the spherical aberration corrector:
moves the coupling lens to a first position where the first laser light incident on the first mirror becomes convergent light at the time of recording or reproducing information on or from the information recording surface of the first information recording medium having the smallest light transmitting layer thickness,
moves the coupling lens to a second position where the first laser light incident on the first mirror becomes divergent light at the time of recording or reproducing information on or from the information recording surface of the first information recording medium having the largest light transmitting layer thickness, and
moves the coupling lens to a third position where the second laser light incident on the second mirror becomes convergent light at the time of recording or reproducing information on or from the information recording surface of the second information recording medium, and the third position is located between the first and second positions.

15. An optical head according to claim 14, wherein the first and second positions are determined by a correction amount of a third-order spherical aberration created due to an error in the light transmitting layer thickness of the first information recording medium or an initial aberration of the first objective lens.

16. An optical head according to claim 14, further comprising a front photodetector for receiving the second laser light having passed through the second mirror and generating an auto power control signal used to control the output of the second light source based on the received second laser light.

17. An optical head according to claim 1, further comprising:
a second light source for emitting second laser light having a second wavelength longer than the first wavelength; and
a second objective lens for focusing the second laser light on a specified information recording surface of a second information recording medium different from the first information recording medium and including a plurality of information recording surfaces having different light transmitting layer thicknesses,
wherein:
the first mirror is a parallel-plate mirror and transmits and reflects the first laser light at a specified ratio,
the second mirror transmits and reflects the second laser light at a specified ratio,
the coupling lens is arranged between the first light source and the first mirror and between the second light source and the second mirror,
the spherical aberration corrector:
moves the coupling lens to a first position where the first laser light incident on the first mirror becomes convergent light at the time of recording or reproducing information on or from the information recording surface of the first information recording medium having the smallest light transmitting layer thickness,
moves the coupling lens to a second position where the first laser light incident on the first mirror becomes divergent light at the time of recording or reproducing information on or from the information recording surface of the first information recording medium having the largest light transmitting layer thickness,
moves the coupling lens to a fourth position where the second laser light incident on the second mirror becomes convergent light at the time of recording or reproducing information on or from the information recording surface of the second information recording medium having the smallest light transmitting layer thickness, and
moves the coupling lens to a fifth position where the second laser light incident on the second mirror becomes convergent light at the time of recording or reproducing information on or from the information recording surface of the second information recording medium having the largest light transmitting layer thickness, and
the fourth and fifth positions are located between the first and second positions.

18. An optical disc device, comprising:
an optical head according to claim 1;
a motor for driving and rotating an information recording medium; and
a controller for controlling the optical head and the motor.

19. An information processing device, comprising:
an optical disc device according to claim 18; and
an information processing unit for processing information to be recorded by the optical disc device and/or information reproduced from the optical disc device.

20. An optical head, comprising:
a first light source for emitting first laser light having a first wavelength;
a second light source for emitting second laser light having a second wavelength longer than the first wavelength;
a first parallel-plate mirror for reflecting and transmitting the first laser light at a specified ratio;
a second parallel-plate mirror for reflecting and transmitting the second laser light at a specified ratio;
a first objective lens for focusing the first laser light reflected on the first parallel-plate mirror on a specified information recording surface of a first information recording medium including a plurality of information recording surfaces having different light transmitting layer thicknesses;
a second objective lens for focusing the second laser light reflected on the second parallel-plate mirror on an information recording surface of the second information recording medium different from the first information recording medium;
a coupling lens arranged between the first light source and the first parallel-plate mirror and between the second light source and the second parallel-plate mirror; and
a lens driver for moving the coupling lens in an optical axis direction,
wherein:
the lens driver:
moves the coupling lens to a first position where the first laser light incident on the first parallel-plate mirror becomes convergent light at the time of recording or reproducing information on or from the information recording surface of the first information recording medium having the smallest light transmitting layer thickness,
moves the coupling lens to a second position where the first laser light incident on the first parallel-plate mirror becomes divergent light at the time of recording or reproducing information on or from the information recording surface of the first information recording medium having the largest light transmitting layer thickness,
moves the coupling lens to a third position where the second laser light incident on the second parallel-plate mirror becomes convergent light at the time of recording or reproducing information on or from the information recording surface of the second information recording medium having the smallest light transmitting layer thickness, and
moves the coupling lens to a fourth position where the second laser light incident on the second parallel-plate mirror becomes convergent light at the time of recording or reproducing information on or from the information recording surface of the second information recording medium having the largest light transmitting layer thickness, and
assuming that a position of the coupling lens where the second laser light incident on the second parallel-plate mirror becomes substantially parallel light is a fifth position,
the fifth position is located between the first and second positions, and
the third position and the fourth position are located between the first and fifth positions.

21. An optical head, comprising:
a first light source for emitting first laser light having a first wavelength;
a second light source for emitting second laser light having a second wavelength longer than the first wavelength;
a parallel-plate mirror for transmitting and reflecting the first laser light and the second laser light at a specified ratio;
a light collecting optical system for focusing the first laser light on a specified information recording surface of a first information recording medium including a plurality of information recording surfaces having different light transmitting layer thicknesses, and focusing the second laser light on a specified information recording surface of a second information recording medium including a plurality of information recording surfaces having different light transmitting layer thicknesses;
a coupling lens arranged between the first light source and the parallel-plate mirror; and a lens driver for moving the coupling lens in an optical axis direction,
wherein:
the lens driver:
moves the coupling lens to a first position where the first laser light incident on the parallel-plate mirror becomes convergent light at the time of recording or reproducing information on or from the information recording surface of the first information recording medium having the smallest light transmitting layer thickness,
moves the coupling lens to a second position where the first laser light incident on the parallel-plate mirror becomes divergent light at the time of recording or reproducing information on or from the information recording surface of the first information recording medium having the largest light transmitting layer thickness,
moves the coupling lens to a third position where the second laser light incident on the parallel-plate mirror becomes convergent light at the time of recording or reproducing information on or from the information recording surface of the second information recording medium having the smallest light transmitting layer thickness, and
moves the coupling lens to a fourth position where the second laser light incident on the parallel-plate mirror becomes convergent light at the time of recording or reproducing information on or from the information recording surface of the second information recording medium having the largest light transmitting layer thickness, and
assuming that a position of the coupling lens where the second laser light incident on the parallel-plate mirror becomes substantially parallel light is a fifth position,
the fifth position is located between the first and second positions, and
the third position and the fourth position are located between the first and fifth positions.

22. An optical head according to claim 21, further comprising:
a third light source for emitting third laser light having a third wavelength longer than the second wavelength, wherein
the parallel-plate mirror transmits and reflects the third laser light at a specified ratio, the light collecting optical system focuses the third laser light reflected on the parallel-plate mirror on an information recording surface of a third information recording medium different from the first information recording medium and the second information recording medium, the lens driver moves the coupling lens to a sixth position where the third laser light incident on the parallel-plate mirror becomes divergent light at the time of recording or reproducing information on or from the third information recording medium, and the sixth position is located between the fifth and second positions.

23. An objective lens for use in an optical head for recording or reproducing information on or from a information recording medium including at least three information recording surfaces having different light transmitting layer thicknesses, wherein the objective lens is so designed as to satisfy a relationship of $tc > (t0+tn)/2$ when it is assumed that $t0$ denotes the thickness of a light transmitting layer from the outer surface of the information recording medium to an information recording surface L0 having the largest light transmitting layer thickness, $tn$ denotes the thickness of a light transmitting layer from the outer surface of the information recording medium to an information recording surface Ln having the smallest light transmitting layer thickness, and $tc$ denotes the thickness of a virtual light transmitting layer at which the absolute value of a third-order spherical aberration is minimum when a laser light is incident as parallel light on the objective lens.

* * * * *